US012207149B2

(12) United States Patent
Zhang et al.

(10) Patent No.: US 12,207,149 B2
(45) Date of Patent: Jan. 21, 2025

(54) DUAL ACTIVE PROTOCOL STACK HANDOVER

(71) Applicant: ZTE Corporation, Shenzhen (CN)

(72) Inventors: Mengjie Zhang, Shenzhen (CN); He Huang, Shenzhen (CN); Zijiang Ma, Shenzhen (CN); Jing Liu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 18/742,576

(22) Filed: Jun. 13, 2024

(65) Prior Publication Data
US 2024/0334287 A1 Oct. 3, 2024

Related U.S. Application Data

(63) Continuation of application No. PCT/CN2022/103473, filed on Jul. 1, 2022.

(51) Int. Cl.
*H04W 36/18* (2009.01)
*H04L 5/00* (2006.01)
*H04W 36/00* (2009.01)

(52) U.S. Cl.
CPC ........... *H04W 36/18* (2013.01); *H04L 5/0053* (2013.01); *H04W 36/0033* (2013.01)

(58) Field of Classification Search
CPC ........... H04W 36/185; H04W 36/0069; H04W 36/18; H04W 36/0033; H04W 36/362; H04W 36/00837; H04L 5/0053; H04L 69/18; H04L 5/0048
See application file for complete search history.

(56) References Cited

U.S. PATENT DOCUMENTS

2019/0253945 A1* 8/2019 Paladugu ............ H04W 12/033
2023/0083266 A1* 3/2023 Wu ................... H04W 36/0033
                                                                    370/331
2023/0199578 A1* 6/2023 Wu ....................... H04W 36/03
                                                                    370/331
(Continued)

FOREIGN PATENT DOCUMENTS

CN          112788663 A      5/2021
WO      WO 2021/236750 A1   11/2021

OTHER PUBLICATIONS

International Search Report and Written Opinion for priority application No. PCT/CN2022/103473 dated Dec. 19, 2022, 6p.

(Continued)

*Primary Examiner* — Allahyar Kasraian
(74) *Attorney, Agent, or Firm* — Crowell & Moring LLP

(57) ABSTRACT

In wireless communication, a device may handover between cells of network access for inter-cell mobility without interruptions. In a Dual Active Protocol Stack (DAPS) handover, the user equipment (UE) maintains simultaneous connection with the source node and target node until releasing the source cell after successful access to the target cell. The source node may generate the power coordination and/or resource coordination parameters or configurations that are transmitted to the target node during the handover. When there is a centralized unit (CU) split from a distributed unit (DU), the CU or DU may generate and/or transmit the parameters/configurations to the peer node.

14 Claims, 12 Drawing Sheets

(56) References Cited

U.S. PATENT DOCUMENTS

2023/0199643 A1* 6/2023 Tseng ................ H04W 52/0206
370/318

OTHER PUBLICATIONS

Ericsson, "DAPS HO—Fallback mechanism", 3GPP TSG-RAN WG3 Meeting #107-e, R3-201074, Mar. 6, 2020, 3p.
Ericsson, "Inter-node signalling for DAPS handover", 3GPP TSG-RAN WG1 Meeting #98 bis-e, R2-2002592, Apr. 30, 2020, 10p.
Apple Inc., "Discussion on NR mobility enhancements", 3GPP TSG RAN WG1 Meeting #98 bis, R1-1910976, Oct. 20, 2029, 4p.

* cited by examiner

DUAL ACTIVE PROTOCOL STACK HANDOVER

CROSS-REFERENCE TO RELATED APPLICATION

This application claims priority as a Continuation to PCT App. No. PCT/CN2022/103473, filed on Jul. 1, 2022, published as WO2024000595A1, entitled "DUAL ACTIVE PROTOCOL STACK HANDOVER", the entire disclosure of which is hereby incorporated by reference.

TECHNICAL FIELD

This document is directed generally to wireless communications. More specifically, in a mobile device communications system, there may be improved signaling to reduce mobility interruptions.

BACKGROUND

Wireless communication technologies are moving the world toward an increasingly connected and networked society. Wireless communications rely on efficient network resource management and allocation between user mobile stations and wireless access network nodes (including but not limited to wireless base stations). A new generation network is expected to provide high speed, low latency and ultra-reliable communication capabilities and fulfil the requirements from different industries and users. User mobile stations or user equipment (UE) are becoming more complex and the amount of data communicated continually increases. In order to improve communications and meet reliability requirements for the vertical industry as well as support the new generation network service, communication improvements should be made.

SUMMARY

This document relates to methods, systems, and devices for wireless communications in which a user equipment (UE) has mobility without interruptions. A user equipment (UE) can go through a handover procedure as a user moves. In a Dual Active Protocol Stack (DAPS) handover, the UE maintains simultaneous connection with the source node and target node until releasing the source cell after successful access to the target cell. The source node may generate the power coordination and/or resource coordination parameters or configurations that are transmitted to the target node during the handover. When there is a centralized unit (CU) split from a distributed unit (DU), the CU or DU may generate and/or transmit the parameters/configurations to the peer node.

In one embodiment, a wireless communication method includes sending a request message including a handover indication; and receiving a response message to the request message that includes a handover related configuration based on the handover indication. The sending is from a basestation central unit (CU) to a basestation distributed unit (DU), the receiving is by the basestation CU from the basestation DU, and wherein the handover is a Dual Active Protocol Stack (DAPS) handover wherein a user equipment (UE) maintains a connection with a source cell and a target cell during the handover from the source cell to the target cell. The CU is a source CU, and wherein the DU is a source DU, and wherein the source cell resides in the source CU and source DU. The request message is a UE context modification request message, and the response message is a UE context modification response message. The CU is a target CU, and wherein the DU is a target DU, and wherein the target cell resides in the target CU and target DU. The request message is a UE context setup request message, and the response message is a UE context setup response message. The target CU and the source CU are combined as a single CU. The handover indication includes a indication for DAPS handover initiation; a list of Data Radio Bearers (DRB) information that a DAPS handover is to be initiated for the concerned DRB; or a type of DAPS handover to be initiated. The handover related configuration comprises a Dual Active Protocol Stack (DAPS) handover related coordination configuration. The request message further comprises a Dual Active Protocol Stack (DAPS) handover related coordination configuration, wherein the response message comprises the handover related configuration for the target cell configuration. The response message includes an indication to indicate that a DAPS handover is accepted or rejected; or a list of DRB information to indicate whether a DAPS handover is accepted or rejected for the concerned DRB. The method includes causing the DU to disable multiple Transmission and Reception Point (multi-TRP) operation during the handover; or causing the DU to use the Dual Active Protocol Stack (DAPS) handover related coordination configuration for power coordination or resource coordination between the source cell and target cell during DAPS handover. The method includes sending a second request message to the target DU, wherein the second request message comprises a DAPS handover status indication to indicate that a DAPS handover is to be completed or the source cell is to be released. The method includes causing the DU to enable multiple Transmission and Reception Point (multi-TRP) operation after the handover is completed; or causing the DU to discard the Dual Active Protocol Stack (DAPS) handover related coordination configuration for power coordination or resource coordination between the source cell and target cell during DAPS handover. The method includes sending a third request message to indicate a Dual Active Protocol Stack (DAPS) handover related coordination configuration for power coordination or resource coordination between the source cell and target cell during DAPS handover. The handover related coordination configuration includes a Dual Active Protocol Stack (DAPS) handover related power coordination parameters; a DAPS handover related resource coordination parameters; or a DAPS handover related capability indication.

In another embodiment, a wireless communication method includes receiving a request message including a handover indication; and sending a response message to the request message that includes a handover related configuration based on the handover indication. The receiving is at a basestation distributed unit (DU) from a basestation central unit (CU), and the sending is by the basestation DU to the basestation CU, and wherein the handover is a Dual Active Protocol Stack (DAPS) handover wherein a user equipment (UE) maintains a connection with a source cell and a target cell during the handover from the source cell to the target cell. The CU is a source CU, and wherein the DU is a source DU, and wherein the source cell resides in the source CU and source DU. The request message is a UE context modification request message, and the response message is a UE context modification response message. The CU is a target CU, and wherein the DU is a target DU, and wherein the target cell resides in the target CU and target DU. The request message is a UE context setup request message, and the response message is a UE context setup response message. The target CU and the source CU are combined as a single CU. The handover indication includes a indication for DAPS handover initiation; a list of Data Radio Bearers (DRB) information that a DAPS handover is to be initiated for the concerned DRB; or a type of DAPS handover to be initiated. The handover related configuration comprises a Dual Active Protocol Stack (DAPS) handover related coordination configuration. The request message further comprises a Dual Active Protocol Stack (DAPS) handover related coordination configuration. The response message includes an indication to indicate that a DAPS handover is accepted or rejected; or a list of DRB information to indicate whether a DAPS handover is accepted or rejected for the concerned DRB. The method includes disabling multiple Transmission and Reception Point (multi-TRP) operation during the handover; or utilizing the Dual Active Protocol Stack (DAPS) handover related power coordination parameters, wherein the DAPS handover related resource coordination parameters for power coordination or resource coordination between the source cell and target cell during DAPS handover. The method includes receiving a second request message, wherein the second request message comprises a DAPS handover status indication to indicate that a DAPS handover is to be completed or the source cell is to be released. The method includes enabling multiple Transmission and Reception Point (multi-TRP) operation after the handover is completed; or discarding the Dual Active Protocol Stack (DAPS) handover related power coordination parameters, the DAPS handover related resource coordination parameters for power coordination or resource coordination between the source cell and target cell during DAPS handover. The method includes receiving a third request message to indicate a Dual Active Protocol Stack (DAPS) handover related coordination configuration for power coordination or resource coordination between the source cell and target cell during DAPS handover. The handover related coordination configuration includes a Dual Active Protocol Stack (DAPS) handover related power coordination parameters; a DAPS handover related resource coordination parameters; or a DAPS handover related capability indication.

In one embodiment, a wireless communications apparatus comprises a processor and a memory, and the processor is configured to read code from the memory and implement any of the embodiments discussed above.

In one embodiment, a computer program product comprises a computer-readable program medium code stored thereupon, the code, when executed by a processor, causes the processor to implement any of the embodiments discussed above.

In some embodiments, there is a wireless communications apparatus comprising a processor and a memory, wherein the processor is configured to read code from the memory and implement any methods recited in any of the embodiments. In some embodiments, a computer program product comprising a computer-readable program medium code stored thereupon, the code, when executed by a processor, causing the processor to implement any method recited in any of the embodiments. The above and other aspects and their implementations are described in greater detail in the drawings, the descriptions, and the claims.

DETAILED DESCRIPTION

Figure 1:
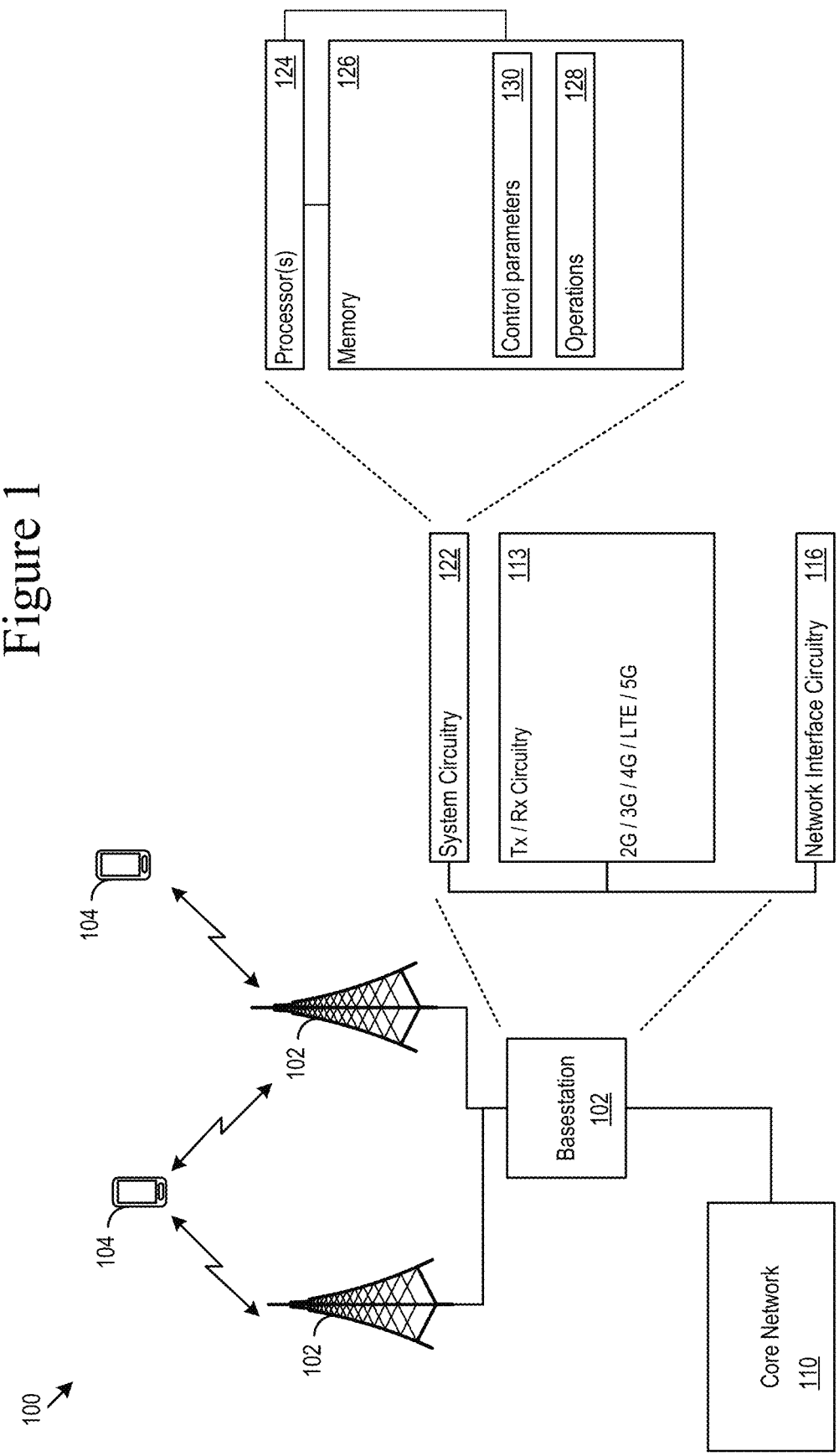
FIG. 1 shows an example basestation.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on"

or "determined by" may be understood as not necessarily intended to convey an exclusive set of factors and may, instead, allow for existence of additional factors not necessarily expressly described, again, depending at least in part on context.

Radio resource control ("RRC") is a protocol layer between UE and the basestation at the IP level (Network Layer). There may be various Radio Resource Control (RRC) states, such as RRC connected (RRC_CONNECTED), RRC inactive (RRC_INACTIVE), and RRC idle (RRC_IDLE) state. RRC messages are transported via the Packet Data Convergence Protocol ("PDCP"). As described, UE can transmit data through a Random Access Channel ("RACH") protocol scheme or a Configured Grant ("CG") scheme. CG may be used to reduce the waste of periodically allocated resources by enabling multiple devices to share periodic resources. The basestation or node may assign CG resources to eliminate packet transmission delay and to increase a utilization ratio of allocated periodic radio resources. The CG scheme is merely one example of a protocol scheme for communications and other examples, including but not limited to RACH, are possible. The wireless communications described herein may be through radio access.

There may be a master node ("MN") and one or more secondary nodes ("SN"). The MN may include a master cell group ("MCG") and the SN may each include a secondary cell group ("SCG"). The MCG is the group of cells provided by the master node ("MN") and the SCG is the group of cells provided by the secondary node ("SN"). The MCG may include a primary cell ("PCell") and one or more secondary cells ("SCell"). The SCG may include a primary secondary cell ("PSCell") and one or more secondary cells ("SCell"). Each primary cell may be connected with multiple secondary cells. The primary cells (PCell, PSCell) are the master cells of their respective groups (MCG, SCG, respectively) and may initiate initial access. The primary cells may be used for signaling and may be referred to as special cell ("spCell") where spCell=PCell+PSCell. The mobility between cells described in these embodiments may be based on the PCell, PSCell, and/or SCell. However, as described, they may be referred to as a source cell and a target cell.

A user equipment ("UE") device may move between nodes or cells in which case a handover or a change/addition operation may occur to improve network reliability for the UE as it moves. The movement may be from a source cell to a target cell based on a number of potential target cells that are referred to as candidates. The movement between cells may also include a number of target cells that are potential candidate cells. A conditional handover ("CHO") and a conditional PSCell addition/change ("CPAC") are described below. The CPAC may include a conditional PSCell change ("CPC") and/or a conditional PSCell addition ("CPA").

A conditional handover ("CHO") can reduce handover interruption time and improve mobility reliability. A CHO is a handover that is executed by the UE when one or more execution conditions are met. The UE can evaluate the execution condition(s) upon receiving the CHO configuration, and can stop evaluating the execution condition(s) once the handover is triggered. The CHO configuration may include a candidate PCell configuration generated by a candidate target node and the corresponding execution condition(s) for that candidate cell.

A conditional PSCell addition/change ("CPAC") may include the UE having a network configuration for initiating access to a candidate PSCell, either to consider whether the PSCell is suitable for SN addition or SN change including an intra-SN change. This consideration may be based on configured condition(s). The UE in the wireless network can operate in dual connectivity ("DC"), including intra-E-UTRA DC or Multi-Radio DC ("MR-DC"). In the example of intra-E-UTRA DC, both the MN and SN provide E-UTRA access. While in the example of MR-DC, one node may provide new radio ("NR") access and the other one provides either E-UTRA or NR access.

Figure 4:
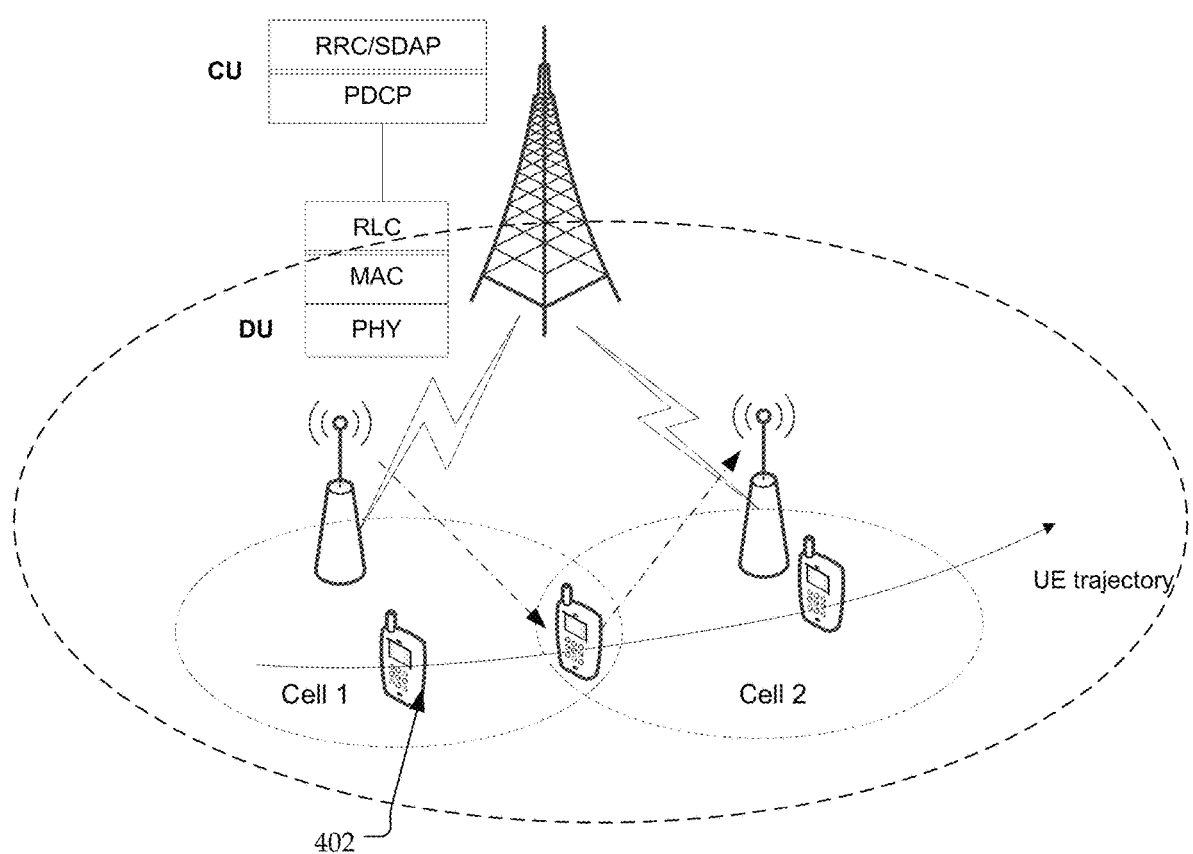
FIG. 4 shows an embodiment of user equipment (UE) intra-DU mobility.
Figure 5:
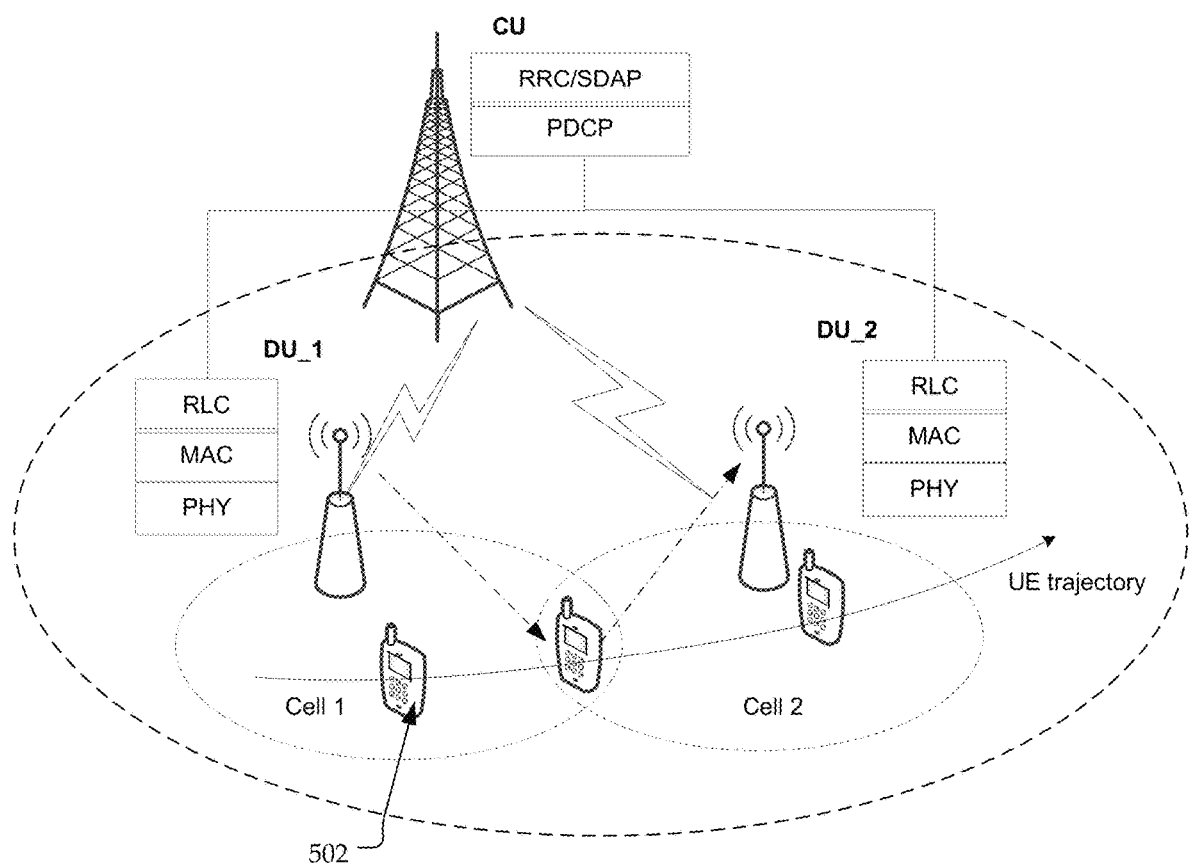
FIG. 5 shows an embodiment of user equipment (UE) intra-CU and inter-DU mobility.
Figure 6:
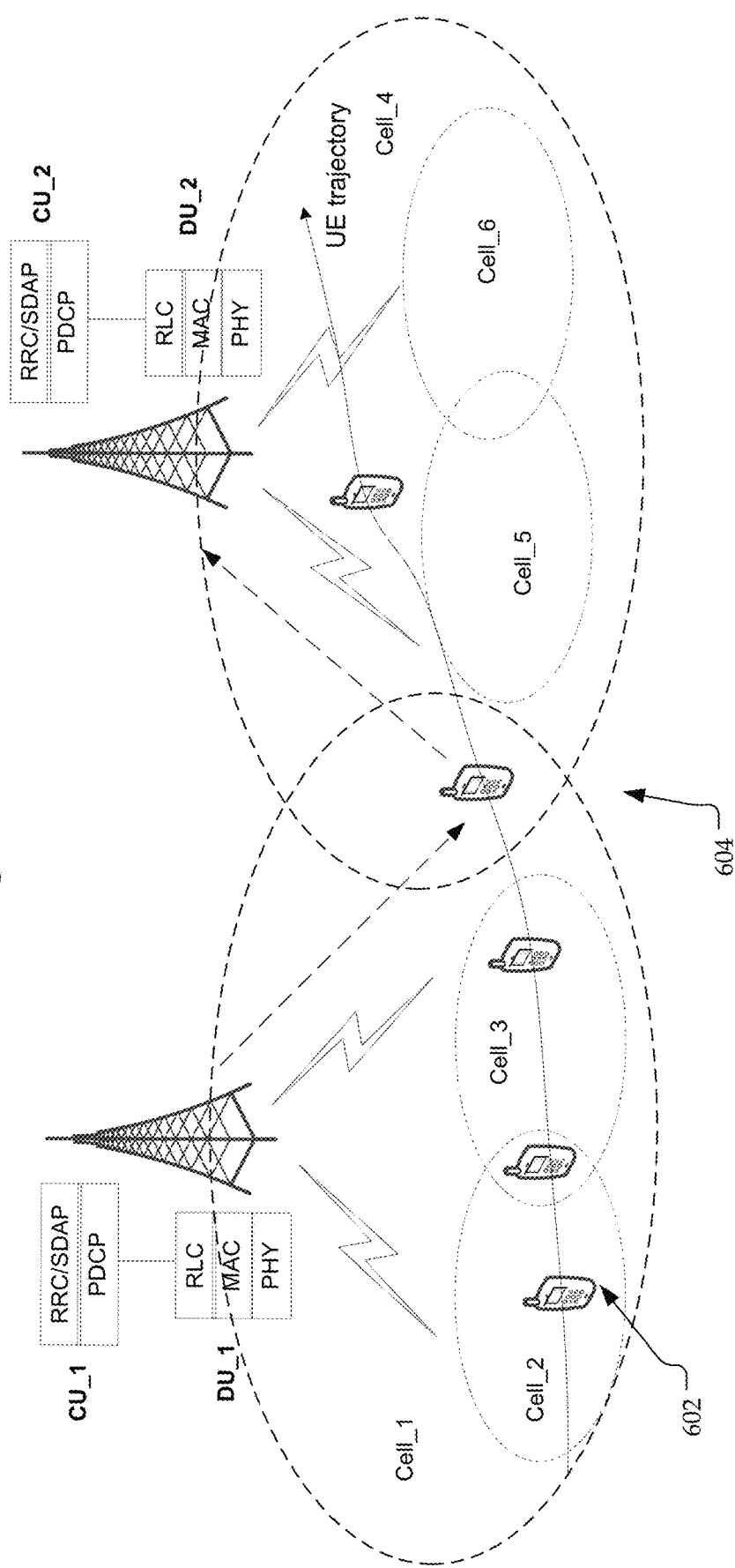
FIG. 6 shows an embodiment of user equipment (UE) inter-CU mobility.
Figure 7:
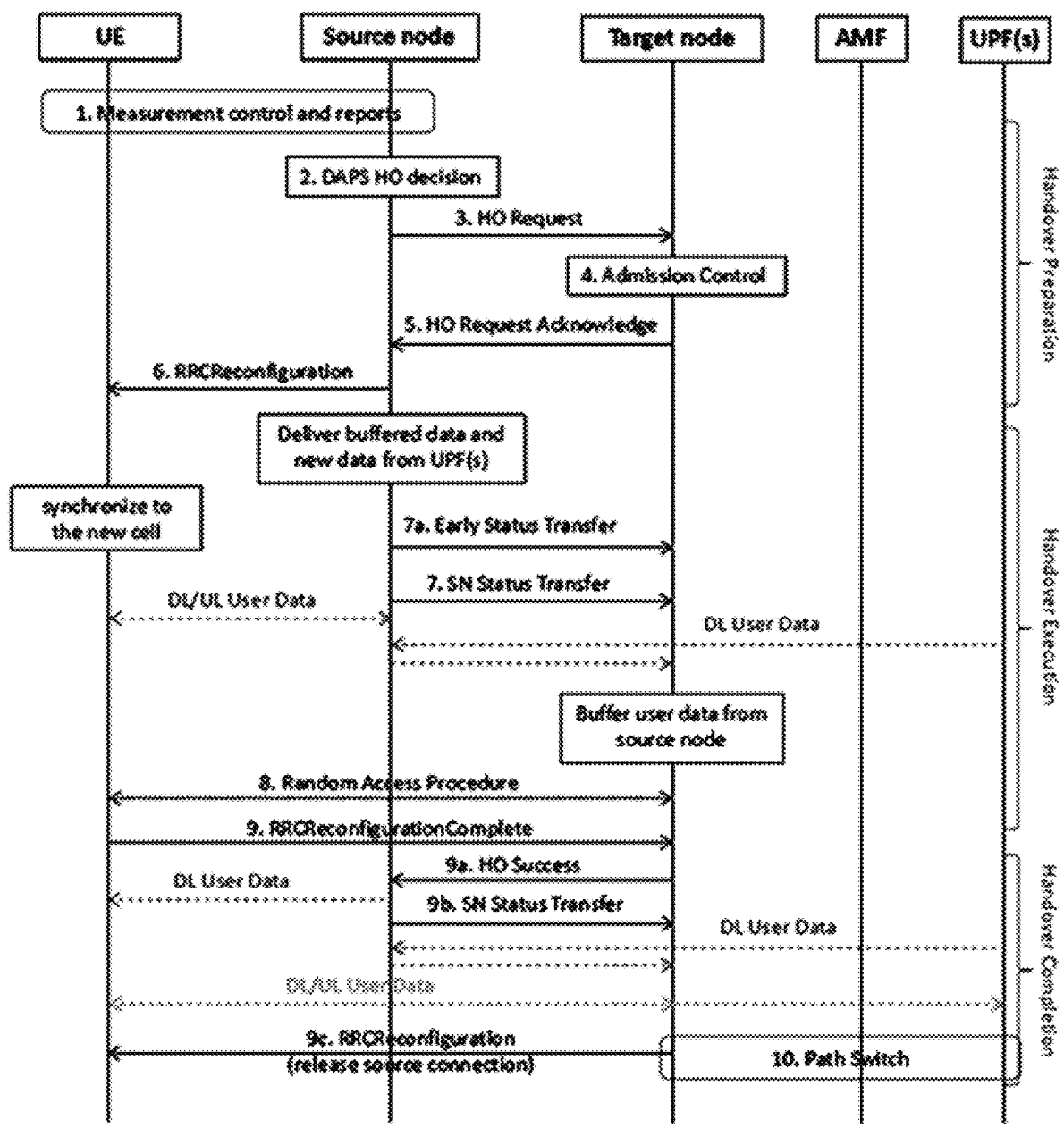
FIG. 7 shows an embodiment of Dual Active Protocol Stack (DAPS) handover (HO).

As described below with respect to FIGS. 1-6, a network provider may include a number of network nodes (i.e. basestations) for providing network access to a user equipment ("UE") device. The network nodes are referred to as basestations in some embodiments. FIGS. 4-6 illustrate cell mobility in which the UE device moves between cells. Control signaling may be used to facilitate this mobility. Mobility may be referred to as handover (HO) or a handover process. Dual Active Protocol Stack (DAPS) handover may reduce mobility interruption. Power coordination and/or resource coordination may occur between a source cell and a target cell in DAPS HO. In the DAPS based handover procedure, the user equipment (UE) maintains simultaneous connection with the source cell and target cell until releasing the source cell after successful random access to the target cell. FIG. 7 illustrates one example of DAPS HO.

Specifically, the source node may generate the power/resource coordination parameters/configurations and transmits them to the target node during HO preparation. When there is a centralized unit (CU) split from a distributed unit (DU), the CU or DU may generate and/or transmit the parameters/configurations to the peer node. In addition, the target DU may need to know when to start/complete DAPS HO (e.g. for resource scheduling, disabling/enabling some features that can not be coexisted with DAPS HO, etc.). FIGS. 9-12 illustrate examples for the CU/DU communications for the DAPS HO.

FIG. 1 shows an example basestation 102. The basestation may also be referred to as a wireless network node and may be the network nodes (e.g. master node ("MN"), secondary node ("SN"), and the source/target nodes) shown in FIGS. 3A-7B. The basestation 102 may be further identified to as a nodeB (NB, e.g., an eNB or gNB) in a mobile telecommunications context. The example basestation may include radio Tx/Rx circuitry 113 to receive and transmit with user equipment (UEs) 104. The basestation may also include network interface circuitry 116 to couple the basestation to the core network 110, e.g., optical or wireline interconnects, Ethernet, and/or other data transmission mediums/protocols.

The basestation may also include system circuitry 122. System circuitry 122 may include processor(s) 124 and/or memory 126. Memory 126 may include operations 128 and control parameters 130. Operations 128 may include instructions for execution on one or more of the processors 124 to support the functioning the basestation. For example, the operations may handle random access transmission requests from multiple UEs. The control parameters 130 may include parameters or support execution of the operations 128. For example, control parameters may include network protocol settings, random access messaging format rules, bandwidth parameters, radio frequency mapping assignments, and/or other parameters.

Figure 2:
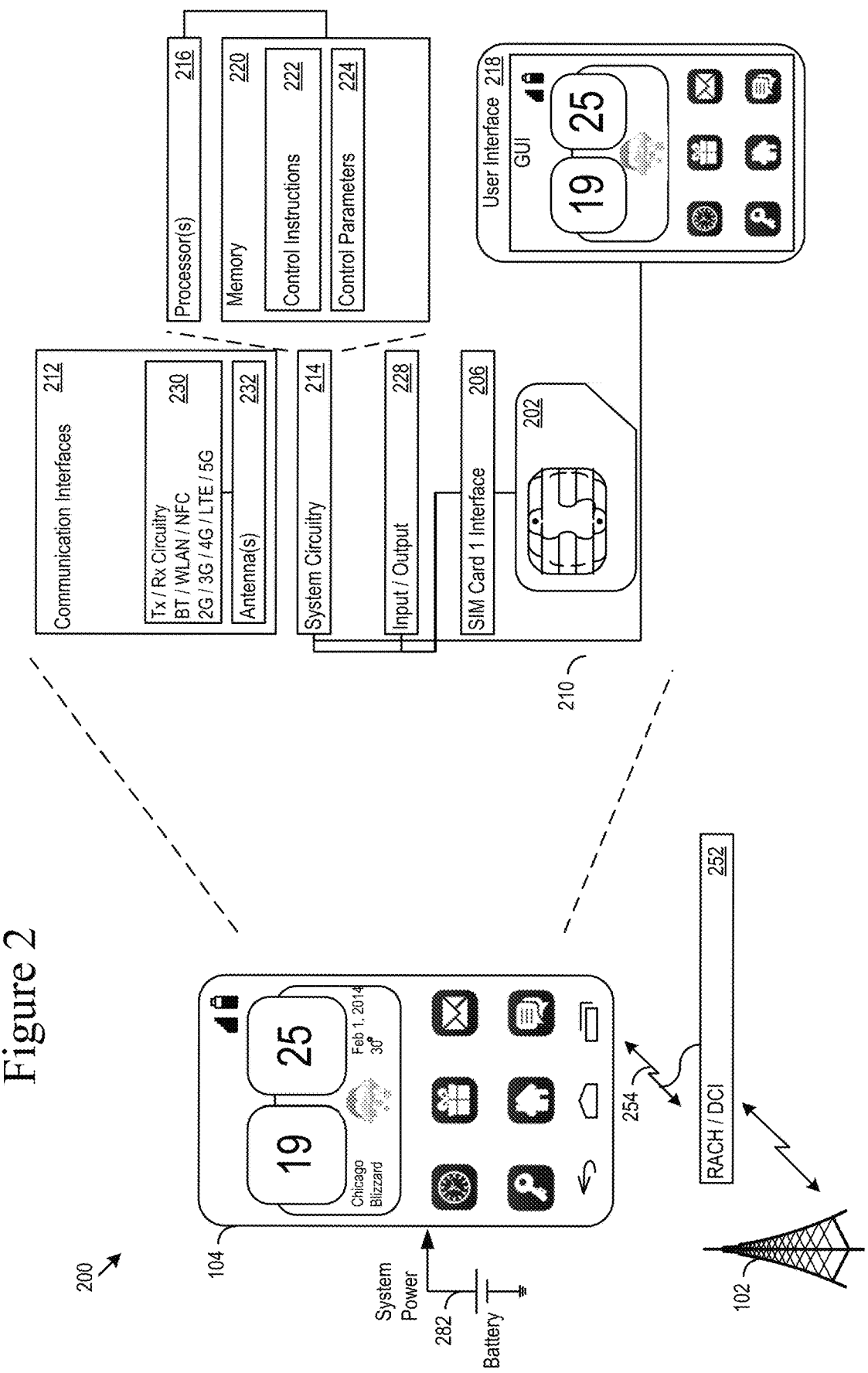
FIG. 2 shows an example random access (RA) messaging environment.

FIG. 2 shows an example random access messaging environment 200. In the random access messaging environment a UE 104 may communicate with a basestation 102 over a random access channel 252. In this example, the UE 104 supports one or more Subscriber Identity Modules (SIMs), such as the SIM1 202. Electrical and physical interface 206 connects SIM1 202 to the rest of the user equipment hardware, for example, through the system bus 210.

The mobile device 200 includes communication interfaces 212, system logic 214, and a user interface 218. The system logic 214 may include any combination of hardware, software, firmware, or other logic. The system logic 214 may be implemented, for example, with one or more systems on a chip (SoC), application specific integrated circuits (ASIC), discrete analog and digital circuits, and other circuitry. The system logic 214 is part of the implementation of any desired functionality in the UE 104. In that regard, the system logic 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 218. The user interface 218 and the inputs 228 may include a graphical user interface, touch sensitive display, haptic feedback or other haptic output, voice or facial recognition inputs, buttons, switches, speakers and other user interface elements. Additional examples of the inputs 228 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 214 may include one or more processors 216 and memories 220. The memory 220 stores, for example, control instructions 222 that the processor 216 executes to carry out desired functionality for the UE 104. The control parameters 224 provide and specify configuration and operating options for the control instructions 222. The memory 220 may also store any BT, WiFi, 3G, 4G, 5G or other data 226 that the UE 104 will send, or has received, through the communication interfaces 212. In various implementations, the system power may be supplied by a power storage device, such as a battery 282

In the communication interfaces 212, Radio Frequency (RF) transmit (Tx) and receive (Rx) circuitry 230 handles transmission and reception of signals through one or more antennas 232. The communication interface 212 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 212 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

Multiple RAN nodes of the same or different radio access technology ("RAT") (e.g. eNB, gNB) can be deployed in the same or different frequency carriers in certain geographic areas, and they can inter-work with each other via a dual connectivity operation to provide joint communication services for the same target UE(s). The multi-RAT dual connectivity ("MR-DC") architecture may have non-co-located master node ("MN") and secondary node ("SN"). Access Mobility Function ("AMF") and Session Management Function ("SMF") may the control plane entities and User Plane Function ("UPF") is the user plane entity in new radio ("NR") or 5GC. The signaling connection between AMF/SMF and the master node ("MN") may be a Next Generation-Control Plane ("NG-C")/MN interface. The signaling connection between MN and SN may an Xn-Control Plane ("Xn-C") interface. The signaling connection between MN and UE is a Uu-Control Plane ("Uu-C") RRC interface. All these connections manage the configuration and operation of MR-DC. The user plane connection between User Plane Function ("UPF") and MN may be NG-U (MN) interface instance.

Figure 3:
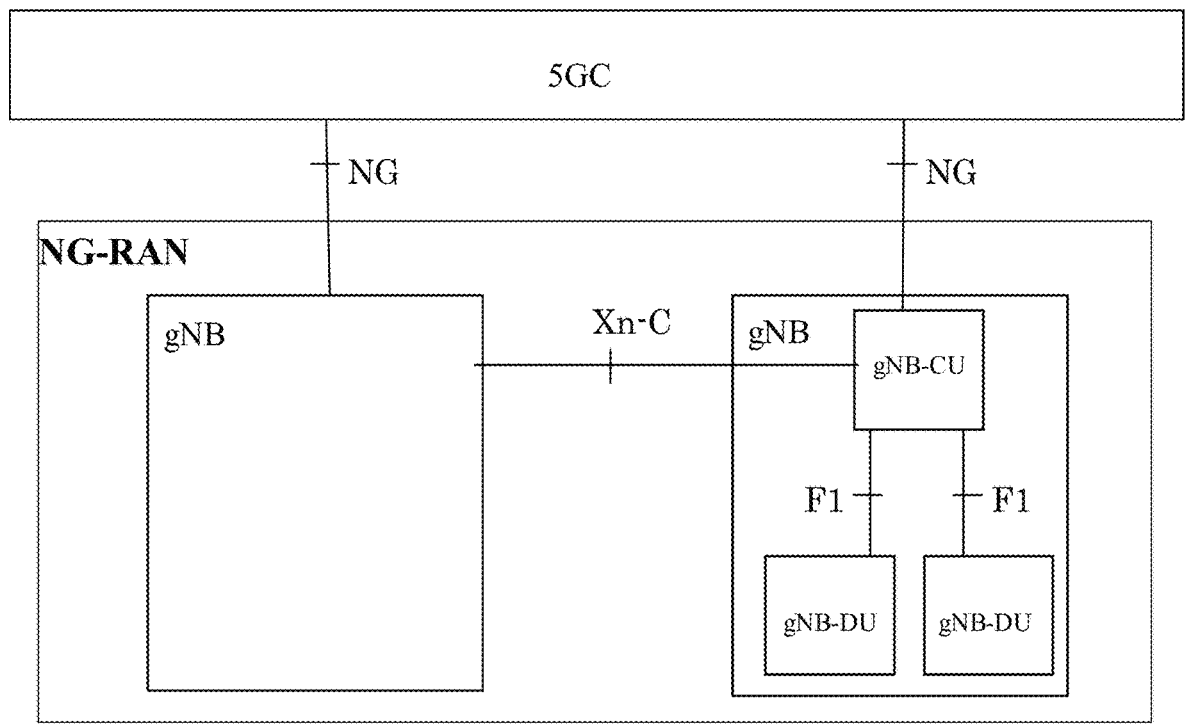
FIG. 3 shows a network architecture of a basestation Central Unit (CU) and basestation Distributed Unit (DU).

FIG. 3 shows a network architecture of a basestation Central Unit (CU) and basestation Distributed Unit (DU). FIG. 3 illustrates basestations (labeled as "gNB") that communicate with an overall network (labeled ("5GC"). Basestations can communicate with one another via a control plane interface ("Xn-C"). One basestation is shown as have one CU that is connected to two DUs via an F1 interface. This is merely one example of an arrangement of a basestation. In some embodiments, there may be one or any number of DUs connected with a single CU.

The basestation can be divided into two physical entities named Centralized Unit ("CU") and Distributed Unit ("DU"). Generally, the CU may provide support for the higher layers of the protocol stack such as SDAP, PDCP and RRC while the DU provides support for the lower layers of the protocol stack such as RLC, MAC and Physical layer. The CU may include operations for a transfer of user data, mobility control, radio access network sharing, session management, etc., except those functions allocated exclusively to the DU. The DU(s) are logical node(s) with a subset of the basestation functions, and may be controlled by the CU.

The CU may be a logical node hosting RRC, SDAP and PDCP protocols of the basestation or RRC and PDCP protocols of the basestation that controls the operation of one or more DUs. The DU may be a logical node hosting RLC, MAC and PHY layers of the basestation, and its operation may be at least partly controlled by the CU. A single DU may support one or multiple cells. However, each cell is only supported by a single DU. Each basestation may support many cells. As described in the embodiments herein, the cell mobility between cells may be from different CUs or DUs or may be internal to the CU and/or the DU.

The inter-cell mobility described herein may occur in a number of different examples. There may be intra-DU mobility where a UE changes cells within a single DU. Examples of intra-DU mobility include: 1) PCell change within one DU (may also include PCell change with SCell change); 2) PSCell change within one DU (may also include PSCell change with SCell change); and 3) PCell change within one DU with PSCell change within one DU (may also include SCell change within one cell group). In another mobility embodiment, there may be intra-CU and inter-DU mobility where a UE changes cells between different DUs but within a single CU. Examples of intra-CU and inter-DU mobility include: 1) PCell change across DU but within one CU (may also include PCell change with SCell change); and 2) PSCell change across DU but within one CU (may also include PSCell change with SCell change). In another mobility embodiment, there may be inter-CU mobility where a UE changes cells between different CUs. Examples of inter-CU mobility include: 1) PCell change across CU (may also include PCell change with SCell change); and 2) PSCell change across CU (may also include PSCell change with SCell change). In another embodiment, there may be a SCell change/addition and this example may include the SCell addition/change within one cell group. FIGS. 4-6 illustrate embodiments of UE mobility between cells.

FIG. 4 shows an embodiment of user equipment (UE) intra-DU mobility. The basestation may include a CU and at least one DU. In this embodiment, there is a single DU shown that has multiple cells. Both Cell 1 and Cell 2 are from the single DU. In this example, the UE 402 can move from Cell 1 to Cell 2 and is depicted in FIG. 4 with a UE trajectory from Cell 1 to Cell 2. The mobility from cells may occur when the UE 402 is in a position between the two cells and making its way to the third position within Cell 2. This is intra-DU mobility because the UE is moving cells within a single DU.

FIG. 5 shows an embodiment of user equipment (UE) intra-CU and inter-DU mobility. In this embodiment, the basestation may include a CU and two DUs (DU_1 and DU_2). Although each DU may have multiple cells, for this example each DU is shown providing a single cell such that DU_1 is providing Cell 1 and DU_2 is providing Cell 2. In this example, the UE 502 can move from Cell 1 to Cell 2 and is depicted in FIG. 5 with a UE trajectory from Cell 1 to Cell 2 which also results in a transition from DU_1 to DU_2. The mobility from cells may occur when the UE 402 is in a position between the two cells and making its way to the third position within Cell 2. This is intra-CU mobility because the UE is moving cells within a single CU. However, this is also inter-DU mobility because the UE is moving between different DUs.

FIG. 6 shows an embodiment of user equipment (UE) inter-CU mobility. In this embodiment, the basestation may include multiple CUs (CU_1 and CU_2). Each CU may include multiple DUs, but in this example, each CU is shown as having one corresponding DU (CU_1 has DU_1 and CU_2 has DU_2). Each of the DUs is shown with multiple cells. In this example, the UE trajectory of the UE 602 passes from Cell_2 to Cell_3 to an inter-CU position 604 (between CU_1 and CU_2) to Cell_5 and Cell_6. As the UE moves, the mobility may change cells as shown and may transition between a number of cells. Because the UE 602 (at the inter-CU position 604) switches cells from CU_1 to CU_2, this transition is referred to as inter-CU mobility.

DAPS Handover

Dual Active Protocol Stack (DAPS) handover (HO) is one example of a HO type without interruption. The embodiments described herein can apply to any type of HO without interruption or with limited interruptions. For simplicity, the embodiments are described using DAPS HO, but that is merely one example of a HO type. Other HO types can include a HO without interruption time or an HO in which the UE maintains the connection with the source cell and target cell during HO.

FIG. 7 shows an embodiment of Dual Active Protocol Stack (DAPS) handover (HO). To reduce mobility interruption, a Dual Active Protocol Stack (DAPS) based handover procedure may be used. In the DAPS based handover procedure, the UE keeps simultaneous connection with the source cell and target cell until releasing the source cell after successful random access to the target cell. FIG. 7 illustrates in block 1, the source node configures the UE measurement procedures and the UE reports according to the measurement configuration. In block 2, the source node decides to handover the UE, based on MeasurementReport and RRM information. In block 3, the source node sends a Handover Request message to the target node, including the DAPS indicator to indicate that DAPS HO is requested. In block 4, admission control may be performed by the target node. In block 5, the target node decides to accept DAPS HO and sends the Handover Request Acknowledge to the source node, which includes a DAPS response indicator to indicate if a DAPS HO is accepted. In block 6, the source node triggers the Uu handover by sending an RRCReconfiguration message to the UE. For DRBs configured with DAPS, the source node may not stop transmitting downlink packets until it receives the Handover Success message from the target node in step 9a. In block 7a, the source node sends the Early Status Transfer message to the target node to convey the uplink/downlink PDCP SN status. Alternatively, in block 7, the source node sends the SN Status Transfer message to the target node to convey the uplink/downlink PDCP SN status. In block 8, the UE initiates random access to the target cell and completes the RRC handover procedure by sending a RRCReconfigurationComplete message to target node. In an example for DAPS HO, the UE may not detach from the source cell upon receiving the RRCReconfiguration message. The UE releases the source connection and configuration upon receiving an explicit release from the target node in step 9c. For DAPS HO the target node sends the Handover Success message to the source node in block 9a to inform that the UE has successfully accessed the target cell. In return, the source node sends the SN Status Transfer message for DRBs configured with DAPS in block 9b. In block 9c, the target node sends an RRCReconfiguration message to the UE, including a DAPS source release indication to explicitly the source connection and configuration. In block 10, there may be a path switch in response.

Coordination Configuration

FIG. 3 illustrated an example where the CU and DU are split (i.e. CU/DU split case) where the source or target CU/DU can decide/generate the DAPS related coordination configuration to be used by the source cell and the target cell during DAPS HO. As described below, the CU/DU coordination and/or interaction may be for a DAPS related coordination configuration The DAPS related coordination configuration may include at least one of the following configurations:
   The DAPS related UL power coordination parameters/configurations;
   The DAPS related resource coordination parameters/configurations;
   The DAPS related capability indication, e.g. the index of FeatureSetUplinkPerCC and/or FeatureSetDownlinkPerCC selected by source cell.

There may be several alternative embodiments to generate the DAPS related coordination configuration and transfer it between the CU and the DU. Four example embodiments are described below. In a first alternative embodiment, the DU decides the DAPS related coordination configuration. In this embodiment, the CU sends a DAPS HO indication to the DU. This indication may also be referred to as an indicator and may be part of the handover. It may be referred to as a DAPS HO indication. The indication may indicate at least one of:

A DAPS HO is to be prepared/configured/requested/initiated;

A list of DRB information that a DAPS HO is to be prepared, configured, requested, and/or initiated for the concerned DRB;

The type of DAPS HO is to be prepared, configured, requested, and/or initiated (e.g. inter-frequency DAPS HO, intra-frequency DAPS HO); or DAPS HO specific configuration (e.g. UL power coordination configuration, resource coordination configuration, DAPS related capability indication, etc.).

The DU may generate the DAPS related coordination configuration and send it to the CU (e.g. in response to reception of the DAPS HO indicator or the inter-frequency DAPS HO indicator from the CU).

In a second alternative embodiment, the CU may decide on the DAPS related coordination configuration. In this example, the CU generates the DAPS related coordination configuration and sends it to the DU.

In a third alternative embodiment, the DU generates the DAPS related coordination configuration (e.g. in response to reception of the DAPS HO indicator or the inter-frequency DAPS HO indicator from the CU) and sends it to the CU. If the CU wants to update or modify the configuration, the CU can generate and send the updated DAPS related coordination configuration to the DU.

In a fourth alternative embodiment, the CU generates DAPS related coordination configuration and sends it to the DU. If the DU wants to update/modify the configuration, the DU can generate and send the updated DAPS related coordination configuration to the CU.

The indication that is transferred from the CU to the DU can be configured several ways. In a first embodiment, the indication may be configured via the F1 interface. The indication (e.g. "DAPS HO Indicator" or "DAPS HO Type") is configured as one information element in a F1-C message (e.g. UE CONTEXT MODIFICATION REQUEST message or UE CONTEXT SETUP REQUEST message).

In a second embodiment, the indication may be configured for an RRC message. In other words, the indication (e.g. "DAPS HO Indicator", "DAPS HO Type") is in a RRC message (e.g. CG-ConfigInfo, CG-Config or Handover-PreparationInformation message). The RRC message may be encapsulated as OCTET STRING/container in a F1-C message (e.g. UE CONTEXT MODIFICATION REQUEST message or UE CONTEXT SETUP REQUEST message).

The DAPS related coordination configuration transferred between the DU and the CU may be configured different ways. In a first embodiment, the DAPS related coordination configuration is included directly as information elements (e.g. "DAPS HO Power Coordination", "DAPS HO Resource Coordination") in a F1-C message (e.g. UE CONTEXT MODIFICATION REQUEST/RESPONSE message or UE CONTEXT SETUP REQUEST/RESPONSE message). The information elements may be included in the DU to CU RRC Information IE within a F1-C message. In a second embodiment, the DAPS related coordination configuration encapsulated as an OCTET STRING/container (e.g. "powerCoordination", "ConfigRestrictInfoDAPS", "DAPS Resource Coordination Transfer Container") may be included in a F1-C message (e.g. UE CONTEXT MODIFICATION REQUEST/RESPONSE message or UE CONTEXT SETUP REQUEST/RESPONSE message). The OCTET STRING/container may be included in the DU to CU RRC Information IE within a F1-C message.

The DAPS related coordination configuration described herein may include different parameters. Examples of the parameters include power coordination parameters and/or resource coordination parameters. Examples of each parameter are described below.

Power Coordination Parameter

The DAPS related uplink (UL) power coordination parameters/configurations may include different information. The power coordination may also be referred to as include at least one of the following items:

The maximum total transmit power to be used by the UE in the source cell group during DAPS handover (e.g. DAPS Source Power, or p-DAPS-Source);

The maximum total transmit power to be used by the UE in the target cell group during DAPS handover (e.g. DAPS Target Power, or p-DAPS-Target);

The uplink power sharing mode that the UE uses in DAPS handover (e.g. Uplink Power Sharing DAPS Mode, or uplinkPowerSharingDAPS-Mode). The mode may be semi-static-mode1, semi-static-mode2, or dynamic; or Coordination assistance information, indicating whether the coordination of UL power between the source cell and the target cell is required or not Resource Coordination Parameter The HO indication may include a resource coordination parameter in addition to the power coordination parameter. In some embodiments, the parameters may be combined, or they may be separate parameters. DAPS related resource coordination parameters/configurations include at least one of:

Source/target cell ID (e.g. CGI, PCI with carrier frequency);

Uplink (UL) coordination information;

Downlink (DL) coordination information;

Coordination assistance information, indicating whether the coordination of resource utilization between the source cell and the target cell is required or not; or Time division multiplexing (TDM) pattern information, including UL/DL reference configuration indicating the time during which a UE configured with DAPS HO may be allowed to transmit (e.g. for single UL transmission).

Figure 8:
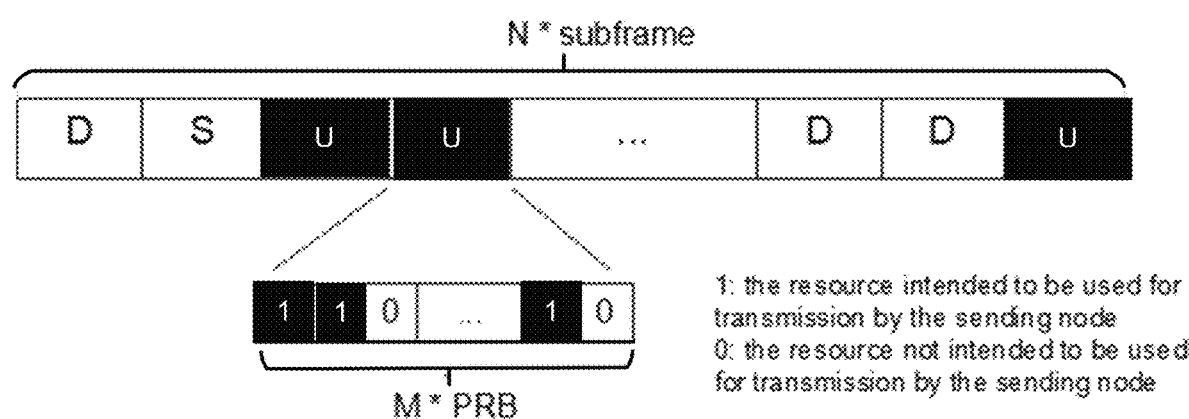
FIG. 8 shows an embodiment of an uplink resource coordination string.

The UL/DL coordination information may include a bitmap/bit string to indicate whether a specific frequency and time resource is intended to be used by the source/target cell. Then the target/source node assumes the resource which is not intended to be used by the source/target cell can be used for the target/source cell. FIG. 8 shows an embodiment of an uplink resource coordination string. This string may be one example of UL coordination information.

Each position in the bitmap may represent a Physical Resource Block (PRB) pair in a subframe. The value "0" may indicate "SpCell resource not intended to be used for transmission by the sending/target/source node", while value "1" indicates "SpCell resource intended to be used for transmission by the sending/target/source node". In other embodiments, the values may be switched. The bit string spans from the first PRB pair of the first represented subframe to the last PRB pair of the same subframe and then moves to the following PRBs in the following subframes in the same order. Each position may be applicable only in positions corresponding to UL subframes. The bit string may span across multiple contiguous subframes (e.g. maximum 40). The first position of the UL Coordination Information may correspond to the receiving node's subframe 0 in a receiving node's radio frame where System Frame Number (SFN)=0. The bit string may span across N subframes and with a length of N*M bits, where M is the PRB number in the single subframe. The UL Coordination Information may be continuously repeated. The same example can also be applied for DL resource coordination, where each position is applicable only in positions corresponding to DL subframes.

Referring back to the resource coordination parameter, one example was TDM pattern information. The TDM pattern information may include at least one of:

Subframe assignment, indicating DL/UL subframe configuration (e.g. as shown in the following table); or Harq offset, indicating a HARQ subframe offset that is applied to the subframes designated as UL in the associated subframe assignment.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Examples for signaling structure on DAPS HO indication may include the following:

TABLE 2

DAPS HO Indicator example.

| IE/Group Name | Presence | Range | IE type and reference | Semantics description | Criticality | Assigned Criticality |
|---|---|---|---|---|---|---|
| DAPS HO Indicator | O | | ENUMERATED (true, . . . ) | | YES | ignore |

TABLE 3

DAPS HO Type example.

| IE/Group Name | Presence | Range | IE type and reference | Semantics description | Criticality | Assigned Criticality |
|---|---|---|---|---|---|---|
| DAPS HO Type | O | | ENUMERATED (intra-freq, inter-freq, . . . ) | | YES | ignore |

TABLE 4

DAPS Request Information List example.

| IE/Group Name | Presence | Range | IE type and reference | Semantics description |
|---|---|---|---|---|
| DAPS Request Information List | | 1 . . . <maxnoofDRBs> | | |
| >DRB ID | M | | INTEGER (1 . . . 32, . . . ) | Indicates that DAPS HO is requested for the concerned DRB. |

Examples for signaling structure for DAPS related UL power coordination parameters/configurations may include the examples shown in Tables 5-6.

TABLE 5

First example for signaling structure for DAPS related UL power coordination parameters/configurations.

| IE/Group Name | Presence | Range | IE type and reference | Semantics description | Criticality | Assigned Criticality |
|---|---|---|---|---|---|---|
| DAPS Source Power | O | | INTEGER (−30 . . . 33) | Identical to the value of the p-DAPS-Source IE within the powerCoordination as defined in TS 38.331. | YES | ignore |
| DAPS Target Power | O | | INTEGER (−30 . . . 33) | Identical to the value of the p-DAPS-Target IE within the powerCoordination as defined in TS 38.331. | YES | ignore |
| Uplink Power Sharing DAPS Mode | O | | ENUMERATED {semi-static-mode1, semi-static-mode2, dynamic} | Identical to the value of the uplinkPowerSharingDAPS-Mode IE within the powerCoordination as defined in TS 38.331. | YES | ignore |

TABLE 6

Second example for signaling structure for DAPS related UL power coordination parameters/configurations.

| IE/Group Name | Presence | Range | IE type and reference | Semantics description | Criticality | Assigned Criticality |
|---|---|---|---|---|---|---|
| PowerCoordination | O | | OCTET STRING | PowerCoordination, as defined in TS 38.331. | YES | ignore |
| ConfigRestrictInfoDAPS | O | | OCTET STRING | ConfigRestrictInfoDAPS, as defined in TS 38.331. | YES | ignore |

In some embodiments, a HO preparation information message (e.g. HandoverPreparationInformation) may be transmitted. The following is example code for the message:

```
-- ASN1START
-- TAG-HANDOVER-PREPARATION-INFORMATION-START
HandoverPreparationInformation ::=        SEQUENCE {
     criticalExtensions                   CHOICE {
        c1                                CHOICE{
          handoverPreparationInformation
HandoverPreparationInformation-IEs,
          spare3 NULL, spare2 NULL, spare1 NULL
       },
       criticalExtensionsFuture           SEQUENCE { }
     }
}
HandoverPreparationInformation-IEs ::=    SEQUENCE {
     *//skip unrelated part//*
     [[
     configRestrictInfoDAPS-r16                 ConfigRestrictInfoDAPS-r16
OPTIONAL,
     sidelinkUEInformationNR-r16                OCTET STRING
OPTIONAL,
     sidelinkUEInformationEUTRA-r16             OCTET STRING
OPTIONAL,
     ueAssistanceInformationEUTRA-r16           OCTET STRING
OPTIONAL,
     ueAssistanceInformationSCG-r16             OCTET STRING (CONTAINING
UEAssistanceInformation) OPTIONAL,     -- Cond HO2
     needForGapsInfoNR-r16                      NeedForGapsInfoNR-r16
OPTIONAL
     ]],
     [[
     configRestrictInfoDAPS-v1640               ConfigRestrictInfoDAPS-v1640
OPTIONAL
     ]],
     [[
```

```
         needForNCSG-InfoNR-r17              NeedForNCSG-InfoNR-r17
OPTIONAL,
         needForNCSG-InfoEUTRA-r17           NeedForNCSG-InfoEUTRA-r17
OPTIONAL,
         mbsInterestIndication-r17           OCTET STRING (CONTAINING
MBSInterestIndication-r17) OPTIONAL
         ]]
}
ConfigRestrictInfoDAPS-r16 ::=              SEQUENCE {
    powerCoordination-r16                       SEQUENCE {
        p-DAPS-Source-r16                           P-Max,
        p-DAPS-Target-r16                           P-Max,
        uplinkPowerSharingDAPS-Mode-r16             ENUMERATED {semi-static-mode1,
semi-static-mode2, dynamic }
    }
OPTIONAL
}
ConfigRestrictInfoDAPS-v1640 ::=   SEQUENCE {
    sourceFeatureSetPerDownlinkCC-r16        FeatureSetDownlinkPerCC-Id,
    sourceFeatureSetPerUplinkCC-r16          FeatureSetUplinkPerCC-Id
}
    *//skip unrelated part//*
-- TAG-HANDOVER-PREPARATION-INFORMATION-STOP
-- ASN1STOP
```

The following tables illustrate example field descriptions:

TABLE 7

Field descriptions for parameters for AS-Context.
AS-Context field descriptions configRestrictInfoDAPS
Includes fields for which source cell explicitly indicates the restriction to be observed by target cell during DAPS handover.
mbsInterestIndication
Includes the information last reported by the UE in the NR MBSInterestIndication message, if any.
needForGapsInfoNR
Includes measurement gap requirement information of the UE for NR target bands.
selectedBandCombinationSN
Indicates the band combination selected by SN in (NG)EN-DC, NE-DC, and NR-DC.
sidelinkUEInformationEUTRA
This field includes SidelinkUEInformation IE as specified in TS 36.331 [10].
sidelinkUEInformationNR
This field includes SidelinkUEInformationNR IE.
ueAssistanceInformation

TABLE 7-continued

Field descriptions for parameters for AS-Context.
AS-Context field descriptions

Includes for each UE assistance feature the information last reported by the UE, if any.
ueAssistanceInformationSCG
Includes for each UE assistance feature associated with the SCG, the information last reported by the UE in the NR UEAssistanceInformation message for the SCG, if any.

TABLE 8

Field descriptions for parameters for ConfigRestrictInfoDAPS.
ConfigRestrictInfoDAPS field descriptions sourceFeatureSetPerUplinkCC/sourceFeatureSetPerDownlinkCC
Indicates an index referring to the position of the FeatureSetUplinkPerCC/FeatureSetDownlinkPerCC selected by source in the featureSetsUplinkPerCC/featureSetsDownlinkPerCC.

Examples for signalling structure for DAPS related resource coordination parameters/configurations:

TABLE 9

First example for signaling structure for DAPS related resource coordination parameters/configurations.

| IE/Group Name | Presence | Range | IE Type and Reference | Semantics Description |
|---|---|---|---|---|
| Source Cell ID | O | | NR/E-UTRA CGI | This IE indicates the SpCell. |
| Target Cell ID | O | | NR/E-UTRA CGI | This IE indicates the SpCell. |
| UL Coordination Information | O | | BIT STRING (6 . . . 4400, . . . ) | Each position in the bitmap represents a PRB pair in a subframe; value "0" indicates "SpCell resource not intended to be used for transmission by the sending node", value "1" indicates "SpCell resource intended to be used for transmission by the sending node". The bit string spans from the first PRB pair of the first represented subframe to the last PRB pair of the same subframe and then moves to the following PRBs in the following subframes in the same order. Each position is applicable only in positions corresponding to UL subframes or SL subframes for sidelink transmission. |

TABLE 9-continued

First example for signaling structure for DAPS related resource coordination parameters/configurations.

| IE/Group Name | Presence | Range | IE Type and Reference | Semantics Description |
|---|---|---|---|---|
| DL Coordination Information | O | | BIT STRING (6 ... 4400, ... ) | The bit string may span across multiple contiguous subframes (maximum 40). The first position of the UL Coordination Information corresponds to the receiving node's subframe 0 in a receiving node's radio frame where SFN = 0. The UL Coordination Information is continuously repeated. Each position in the bitmap represents a PRB pair in a subframe; value "0" indicates "SpCell resource not intended to be used for transmission by the sending node", value "1" indicates "SpCell resource intended to be used for transmission by the sending node". The bit string spans from the first PRB pair of the first represented subframe to the last PRB pair of the same subframe and then moves to the following PRBs in the following subframes in the same order. Each position is applicable only in positions corresponding to DL subframes. The bit string may span across multiple contiguous subframes (maximum 40). The first position of the DL Coordination Information corresponds to the receiving node's subframe 0 in a receiving node's radio frame where SFN = 0. The DL Coordination Information is continuously repeated. |
| Coordination Assistance Information | O | | ENUMERATED (Coordination Not Required, ... ) | |

TABLE 10

Second example for signaling structure for DAPS related resource coordination parameters/configurations.

| IE/Group Name | Presence | Range | IE type and reference | Semantics description | Criticality | Assigned Criticality |
|---|---|---|---|---|---|---|
| Resource Coordination Transfer Container | O | | OCTET STRING | Includes the DAPS Resource Coordination Information IE. (Note: The DAPS Resource Coordination Information IE includes IEs similar to option 1, which may be defined in other interfaces, e.g. XnAP/X2AP.) | YES | ignore |

For inter-CU mobility, there may be several embodiments to generate/transfer the DAPS related coordination configuration between the source CU/node and the target CU/node. Example embodiments for the generation/transfer include:

Option 1: The source CU/node transfers the generated DAPS related coordination configuration to the target CU/node via a Xn/X2 message, e.g. Handover Request message.

Option 1a: If the target CU/node wants to update/modify the DAPS related coordination configuration, the target CU/node sends the updated DAPS related coordination configuration to the source CU/node via a Xn/X2 message, e.g. Handover Request Acknowledge message.

Option 2: The target CU/node transfers the generated DAPS related coordination configuration to the source CU/node via a Xn/X2 message, e.g. Handover Request Acknowledge message.

Option 2a: If the source CU/node wants to update/modify the DAPS related coordination configuration, the source CU/node sends the updated DAPS related coordination configuration to the target CU/node via a Xn/X2 message.

The DAPS related coordination configuration can be transferred by one of the following options:

Option 1: Include the configuration as information elements in a Xn/X2 message, e.g. Handover Request message or Handover Request Acknowledge message.

Option 2: Include the configuration in a RRC message, e.g. HandoverPreparationInformation message. The RRC message is encapsulated as OCTET STRING/container in a Xn/X2 message, e.g. Handover Request message.

DAPS HO Status

The CU/DU coordination/interaction may rely on a DAPS HO status. The DAPS HO status may be used to inform the DU when to start/complete DAPS HO, e.g. for resource scheduling, disabling/enabling some features that cannot be coexisted with DAPS HO, etc. This may be on DAPS HO initiation. The CU sends a DAPS HO indication to the DU, to indicate that DAPS HO is to be prepared, configured, requested, or initiated. The indication for the DAPS HO initiation may indicate at least one of:

- A DAPS HO is to be prepared/configured/requested/initiated;
- A list of DRB information that a DAPS HO is to be prepared, configured, requested, or initiated for the concerned DRB;
- The type of DAPS HO is to be prepared, configured, requested, or initiated (e.g. inter-frequency DAPS HO, intra-frequency DAPS HO).
- DAPS HO specific configuration (e.g. UL power coordination configuration, resource coordination configuration, or DAPS related capability indication).

In response to reception of DAPS HO indication, the DU may perform at least one of:

- Consider the DAPS HO is to be prepared/configured/requested/initiated.
- Use the received/generated DAPS related coordination parameters/configurations for the purpose of power and/or resource coordination between the source cell and target cell in DAPS HO.
- Disable/disallow the feature/operation that can not be co-existed with DAPS HO (e.g. multi-TRP). For example, the DU can disable SDM based Single-DCI based multi-TRP via Enhanced TCI States Activation/Deactivation for UE-specific PDSCH MAC CE.

For the DAPS HO response to reception of a DAPS HO indication from the CU, the DU may accept/reject the DAPS request or partial DAPS request (e.g. accept DAPS request on some DRBs within the DRB list for DAPS request, and reject DAPS request on other DRBs within the DRB list for DAPS request). The DU sends a DAPS HO response indication to the CU. The DAPS HO response indication may include at least one of:

- An indication to indicate that DAPS HO is accepted/rejected; or
- A list of DRB information to indicate whether a DAPS HO is accepted/rejected for the concerned DRB.

For inter-CU mobility, in response to reception of a DAPS HO response indication from the target CU, the source CU may send a DAPS HO response indication to the source DU. If the DAPS HO response indication indicates that the DAPS HO is rejected, the source DU may discard/release the previously generated/received DAPS related coordination configuration. FIG. 9-12 illustrate example communications that include the DAPS HO initiation and DAPS HO response described above.

The UE successfully transfers/switches to a target node, e.g. successful completion random access procedure to the target cell. The CU sends an indication (e.g. DAPS HO Completion Indication, Source Cell Release Indication, or set the value of DAPS HO Indication to "completion/release/stop") to the DU indicating that a DAPS HO is to be completed or the source cell is to be released (e.g. when the CU decides to release the source cell or when generating/sending a RRC reconfiguration message including dapsSourceRelease IE). In some embodiments, it may be when the CU successfully releases the source cell (e.g. after sending a RRC reconfiguration message including dapsSourceRelease IE to the UE). In response to reception of the indication for DAPS HO completion/source cell release, the DU may perform at least one of:

- Consider the DAPS HO is to be completed or the source cell is to be released.
- Stop using the received/generated DAPS related coordination parameters/configurations for the purpose of power and/or resource coordination between the source cell and target cell in DAPS HO. The DU may replace the old configuration with new received/generated configuration.
- Enable/allow the feature/operation that cannot be co-existed with DAPS HO (e.g. multi-TRP). For example, the DU can enable SDM based Single-DCI based multi-TRP via Enhanced TCI States Activation/Deactivation for UE-specific PDSCH MAC CE.

The DAPS HO related indication transferred between the CU and the DU can be configured by one of the following options:

- Option 1: Include an indication (e.g. "DAPS HO Indicator") as one information element in a F1-C message (e.g. UE CONTEXT MODIFICATION REQUEST/RESPONSE UE message or CONTEXT SETUP REQUEST/RESPONSE message).
- Option 2: Include an indication (e.g. "DAPS HO Indicator") in an RRC message (e.g. CG-ConfigInfo, or CG-Config or HandoverPreparationInformation message). The RRC message is encapsulated as OCTET STRING in a F1-C message (e.g. UE CONTEXT MODIFICATION REQUEST message or UE CONTEXT SETUP REQUEST message).

The following are example signaling structures for a DAPS HO related indication:

TABLE 11

First example for signaling structure for DAPS HO related indication.

| IE/Group Name | Presence | Range | IE type and reference | Semantics description | Criticality | Assigned Criticality |
|---|---|---|---|---|---|---|
| DAPS HO Status/Indicator | O | | ENUMERATED (true/initiation/request, accept/reject, release/stop/completion, . . . ) | | YES | ignore |

TABLE 12

Second example for signaling structure for DAPS HO related indication.

| IE/Group Name | Presence | Range | IE type and reference | Semantics description |
|---|---|---|---|---|
| DAPS Response Information List | | 1 ... <maxnoofDRBs> | | |
| >DRB ID | M | | INTEGER (1 ... 32, ... ) | |
| >DAPS Response Indicator | M | | ENUMERATED (DAPS HO accepted, DAPS HO not accepted, ... ) | Indicates whether the DAPS Handover has been accepted. |

TABLE 13

Third example for signaling structure for DAPS HO related indication.

| IE/Group Name | Presence | Range | IE type and reference | Semantics description | Criticality | Assigned Criticality |
|---|---|---|---|---|---|---|
| DAPS HO Completion/Source Cell Release Indicator | O | | ENUMERATED (true, ... ) | | YES | ignore |

The DAPS HO description above includes an indication or indicator that is transmitted. That indication may include parameters such as power coordination and/or resource coordination to improve performance during the handover. The description above applies to the following communication examples described with respect to FIGS. 9-12.

Figure 9:
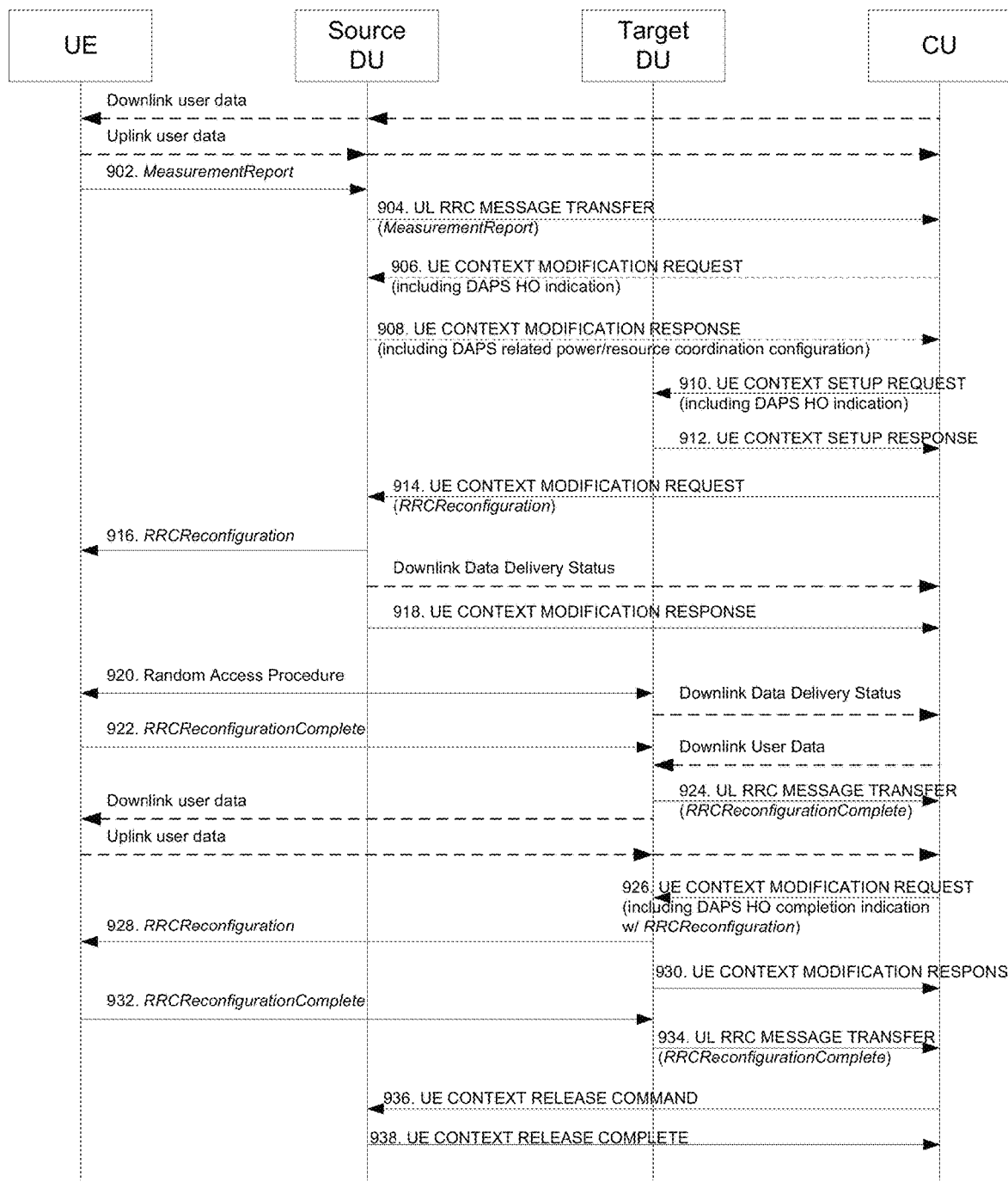
FIG. 9 shows one embodiment of Distributed Unit (DU) and Centralized Unit (CU) communications for intra-CU inter-DU handover (HO).
Figure 11:
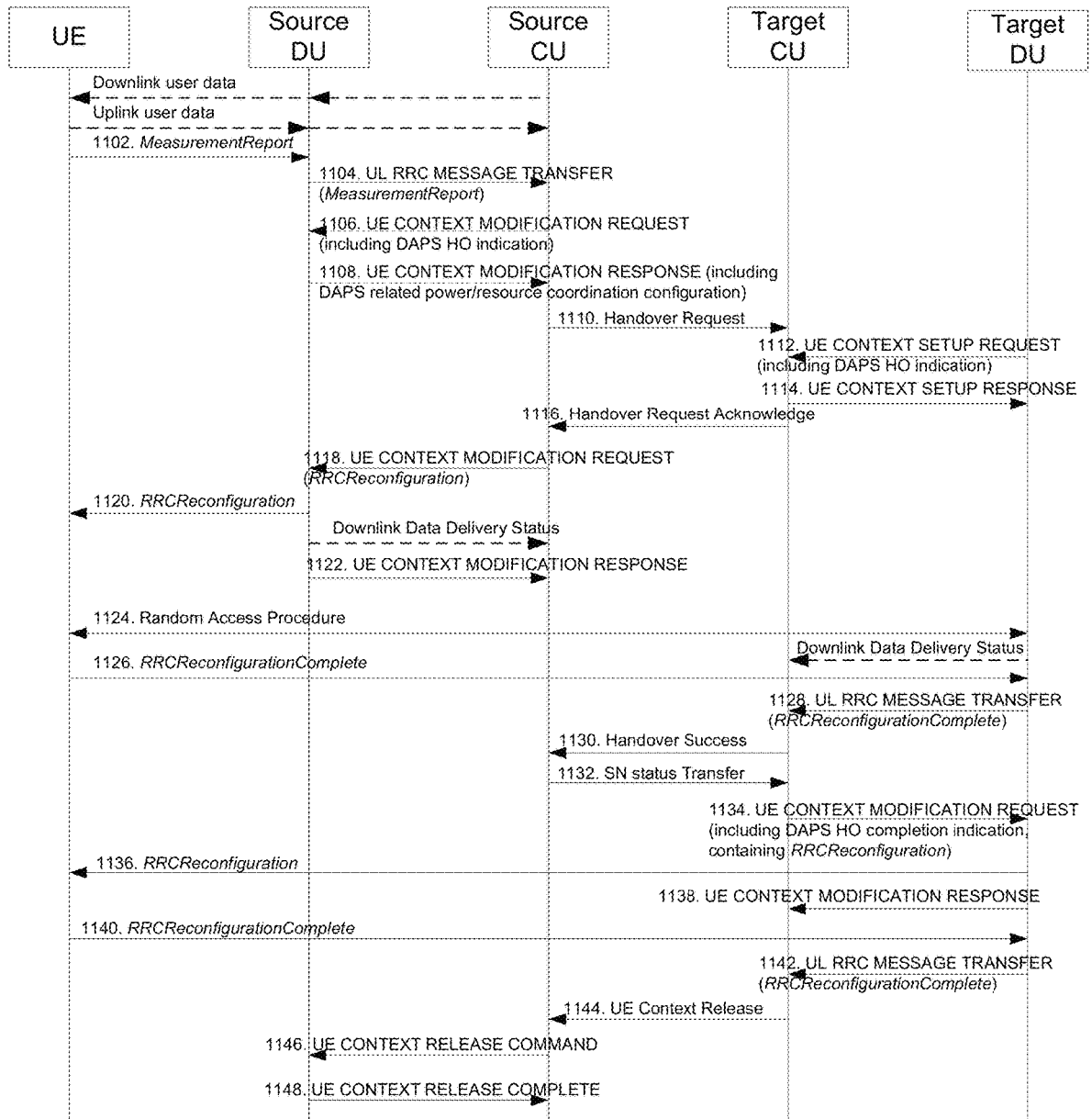
FIG. 11 shows one embodiment of Distributed Unit (DU) and Centralized Unit (CU) communications for inter-CU handover (HO).

FIG. 9 shows one embodiment of Distributed Unit (DU) and Centralized Unit (CU) communications for handover (HO). The CU and DU are discussed above with respect to FIG. 3 and are example basestations. FIG. 9 illustrates communications between the user equipment (UE), a source DU, a target DU, and a CU. The example shown in FIG. 11 is similar to FIG. 9 except there is a source CU and a target CU.

FIG. 9 illustrates that downlink (DL) user data is from the CU to the source DU or the UE, while uplink (UL) user data is from the UE to the source DU or the CU. In block 902, a measurement report (MeasurementReport) message is sent form the UE to the source DU. In block 904, the source DU sends an UL RRC MESSAGE TRANSFER message to the CU to convey the received measurement report message.

In block 906, the CU sends a UE CONTEXT MODIFICATION REQUEST message to the source DU to query the latest configuration. The message may include a DAPS HO indication to the source DU to indicate that a DAPS HO is to be prepared, configured, initiated or requested. The DAPS HO indication may be the HO indication/indicator described above. The indication may include a list of DRB information that a DAPS HO is to be prepared, configured, initiated, or requested for the concerned DRB, or which type of DAPS HO is to be prepared, configured, initiated, or requested (e.g. inter-frequency DAPS HO, intra-frequency DAPS HO), and/or DAPS HO specific configuration.

In block 908, the source DU responds with a UE CONTEXT MODIFICATION RESPONSE message that includes full configuration information. If a DAPS HO indication or a inter-frequency DAPS HO indication is received, the source DU may generate and include DAPS related coordination configuration (e.g. UL power coordination parameters or configurations and/or resource coordination parameters or configurations) into the message. The DU uses the generated coordination configuration for power and/or resource coordination during DAPS HO. If a DAPS HO indication is received, the source DU may disable multi-TRP operation during DAPS HO (e.g. disable SDM based Single-DCI based multi-TRP via Enhanced TCI States Activation/Deactivation for UE-specific PDSCH MAC CE).

In block 910, the CU sends a UE CONTEXT SETUP REQUEST message to the target DU to create a UE context and setup one or more data bearers. The UE CONTEXT SETUP REQUEST message may include a HandoverPreparationInformation message. The UE CONTEXT SETUP REQUEST message or HandoverPreparationInformation message may include the DAPS related coordination configuration. The coordination configuration may also be referred to as the HO related configuration. The UE CONTEXT SETUP REQUEST message may include a DAPS HO indication to the target DU to indicate that a DAPS HO is to be prepared, configured, initiated, or requested. It may also include a list of DRB information that a DAPS HO is to be prepared, configured, initiated, or requested for the concerned DRB, and/or which type of DAPS HO is to be prepared, configured, initiated, or requested (e.g. inter-frequency DAPS HO, intra-frequency DAPS HO), and/or a DAPS HO specific configuration.

In block 912, the target DU responds to the CU with a UE CONTEXT SETUP RESPONSE message. If a DAPS HO indication is received, the target DU may disable multi-TRP operation during DAPS HO (e.g. disable SDM based Single-DCI based multi-TRP via Enhanced TCI States Activation/Deactivation for UE-specific PDSCH MAC CE). If the DAPS related coordination configuration is received, the target DU uses the received coordination configuration for the purpose of either power or resource coordination during DAPS HO.

In block 914, the CU sends a UE CONTEXT MODIFICATION REQUEST message to the source DU, which includes a generated RRCReconfiguration message and indicates to stop the data transmission for the UE. The RRCReconfiguration message may include the DAPS related coordination configuration for the UE. The source DU also sends a Downlink Data Delivery Status frame to inform the CU about the unsuccessfully transmitted downlink data to the UE. For the DAPS handover, the UE CONTEXT MODIFICATION REQUEST message in block 914 may indicate to stop the data transmission only for the DRB(s) not subject to DAPS handover or may not indicate to stop the data transmission at all. Instead, the DL RRC Message Transfer procedure may be used to carry the handover command to the UE. The UE CONTEXT MODIFICATION REQUEST message that indicates to stop the data transmission for the UE is sent to the source DU once the CU knows that the UE has successfully accessed the target DU, for which the source DU sends a DDDS frame about the unsuccessfully transmitted downlink data to the CU.

In block 916, the source DU forwards the received RRCReconfiguration message to the UE. In block 918, the source DU responds to the CU with the UE CONTEXT MODIFICATION RESPONSE message. There may be an optional downlink data delivery status sent from the source DU to the CU. In block 920, a Random Access procedure is performed at the target DU. The target DU sends a Downlink Data Delivery Status frame to inform the CU. Downlink packets (e.g. PDCP PDUs) not successfully transmitted in the source DU, are sent from the CU to the target DU. In some embodiments, it is up to CU implementation whether to start sending DL User Data to DU before or after reception of the Downlink Data Delivery Status. In block 922, the UE responds to the target DU with an RRCReconfigurationComplete message. In block 924, the target DU sends an UL RRC MESSAGE TRANSFER message to the CU to convey the received RRCReconfigurationComplete message. Downlink packets are sent to the UE and/or uplink packets are sent from the UE, which are forwarded to the CU through the target DU.

In block 926, the target CU decides to release the source cell connection. The target CU sends a UE CONTEXT MODIFICATION REQUEST message to the source DU, which includes a generated RRCReconfiguration message including a DAPS-SourceRelease information element (IE) to indicate the release of source cell connection. The UE CONTEXT MODIFICATION REQUEST message may include an indication to indicate the source DU that a DAPS HO is to be completed or source cell is to be released (e.g. set the value of DAPS HO indication to "completion/release/stop"). If the indication is received, the target DU may stop using the DAPS related coordination configuration for the purpose of power and/or resource coordination during DAPS HO, and/or allow multi-TRP operation during DAPS HO (e.g. enable SDM based Single-DCI based multi-TRP via Enhanced TCI States Activation/Deactivation for UE-specific PDSCH MAC CE).

In block 928, the target DU forwards the received RRCReconfiguration message to the UE. In block 930, the source DU responds to the CU with the UE CONTEXT MODIFICATION RESPONSE message. In block 932, the UE responds to the target DU with an RRCReconfigurationComplete message. In block 934, the target DU sends an UL RRC MESSAGE TRANSFER message to the CU to convey the received RRCReconfigurationComplete message. In block 936, the CU sends a UE CONTEXT RELEASE COMMAND message to the source DU. In block 938, the source DU releases the UE context and responds the CU with a UE CONTEXT RELEASE COMPLETE message. In alternative embodiments, the order of blocks 924-938 may vary.

In some embodiments, the CU may update and/or modify the DAPS related coordination configuration and send the requested/updated/new DAPS related coordination configuration (e.g. requested/new values for the DAPS related coordination parameters) to the source DU (e.g. via the UE CONTEXT MODIFICATION REQUEST message) in block 914. If the requested/new/updated configuration is received, the source DU uses the received configuration for the purpose of either power coordination or resource coordination during DAPS HO.

Figure 10:
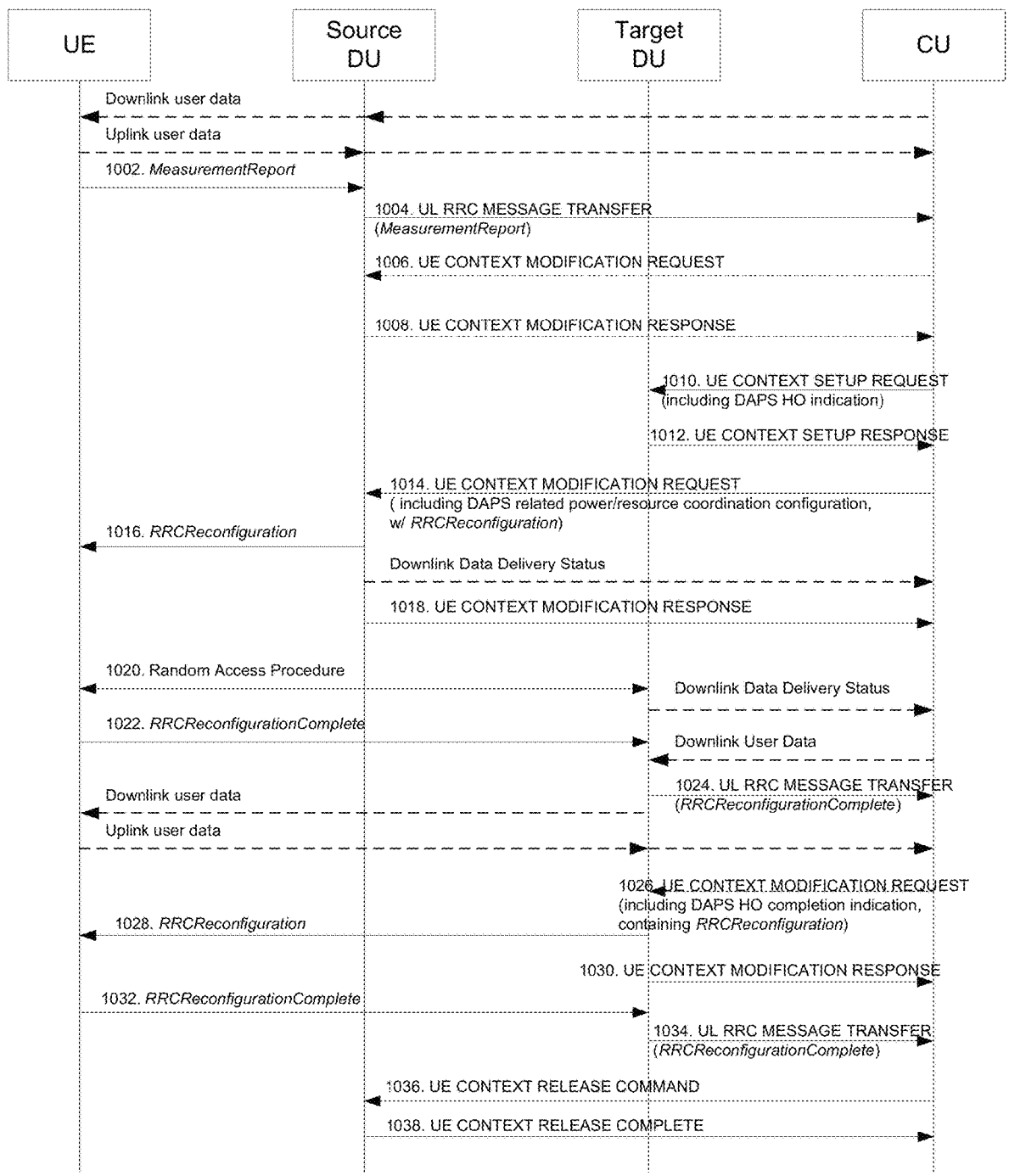
FIG. 10 shows another embodiment of Distributed Unit (DU) and Centralized Unit (CU) communications for intra-CU inter-DU handover (HO).

FIG. 10 shows another embodiment of Distributed Unit (DU) and Centralized Unit (CU) communications for handover (HO). The CU and DU are discussed above with respect to FIG. 3 and are example basestations. FIG. 10 illustrates communications between the user equipment (UE), a source DU, a target DU, and a CU. In block 1002, a measurement report (MeasurementReport) message is sent form the UE to the source DU. In block 1004, the source DU sends an UL RRC MESSAGE TRANSFER message to the CU to convey the received measurement report message. In block 1006, the CU sends a UE CONTEXT MODIFICATION REQUEST message to the source DU to query the latest configuration. In block 1008, the source DU responds with a UE CONTEXT MODIFICATION RESPONSE message that includes full configuration information.

In block 1010, the CU sends a UE CONTEXT SETUP REQUEST message to the target DU to create a UE context and setup one or more data bearers. The message may include a DAPS HO indication to the source DU to indicate that a DAPS HO is to be prepared, configured, initiated, or requested. The DAPS HO indication may be the HO indication/indicator described above. The indication may include a list of DRB information that a DAPS HO is to be prepared, configured, initiated, or requested for the concerned DRB, or which type of DAPS HO is to be prepared, configured, initiated, or requested (e.g. inter-frequency DAPS HO, intra-frequency DAPS HO), and/or DAPS HO specific configuration.

The UE CONTEXT SETUP REQUEST message may include a HandoverPreparationInformation message. The UE CONTEXT SETUP REQUEST message or HandoverPreparationInformation message may include the DAPS related coordination configuration. The coordination configuration may also be referred to as the HO related configuration.

In block 1012, the target DU responds to the CU with a UE CONTEXT SETUP RESPONSE message. If a DAPS HO indication is received, the target DU may disable multi-TRP operation during DAPS HO (e.g. disable SDM based Single-DCI based multi-TRP via Enhanced TCI States Activation/Deactivation for UE-specific PDSCH MAC CE). If the DAPS related coordination configuration is received, the target DU uses the received coordination configuration for the purpose of power and/or resource coordination during DAPS HO.

In block 1014, the CU sends a UE CONTEXT MODIFICATION REQUEST message to the source DU, which includes a generated RRCReconfiguration message and indicates to stop the data transmission for the UE. The RRCReconfiguration message may include the DAPS related coordination configuration to the UE. The CU may include a DAPS HO indication and/or DAPS related coordination configuration into the message. If the coordination configuration is received, the source DU uses the received configuration for power coordination and/or resource coordination during DAPS HO. The source DU may send a Downlink Data Delivery Status frame to inform the CU about the unsuccessfully transmitted downlink data to the UE. If a DAPS related information (e.g. DAPS HO indication, DAPS related resource/power coordination configuration, transmission stop indicator) is received, the source DU may disable multi-TRP operation during DAPS HO (e.g. disable SDM based Single-DCI based multi-TRP via Enhanced TCI States Activation/Deactivation for UE-specific PDSCH MAC CE). The UE CONTEXT MODIFICATION REQUEST message may indicate to stop the data transmission for the UE is sent to the source DU once the CU knows that the UE has successfully accessed the target DU, for which the source DU sends a DDDS frame about the unsuccessfully transmitted downlink data to the CU.

In some embodiments, the CU may send the generated DAPS related coordination configuration to the source DU (e.g. via the UE CONTEXT MODIFICATION REQUEST message in block 1006). In some embodiments, the source DU may update/modify the DAPS related coordination configuration and send the requested/updated/new coordination configuration to the CU (e.g. via the UE CONTEXT MODIFICATION RESPONSE message in block 1008).

In block 1016, the source DU forwards the received RRCReconfiguration message to the UE. In block 1018, the source DU responds to the CU with the UE CONTEXT MODIFICATION RESPONSE message. There may be an optional downlink data delivery status sent from the source DU to the CU. In block 1020, a Random Access procedure is performed at the target DU. The target DU sends a Downlink Data Delivery Status frame to inform the CU. Downlink packets (e.g. PDCP PDUs) not successfully transmitted in the source DU, are sent from the CU to the target DU. In some embodiments, it is up to CU implementation whether to start sending DL User Data to DU before or after reception of the Downlink Data Delivery Status. In block 1022, the UE responds to the target DU with an RRCReconfigurationComplete message. In block 1024, the target DU sends an UL RRC MESSAGE TRANSFER message to the CU to convey the received RRCReconfigurationComplete message. Downlink packets are sent to the UE and/or uplink packets are sent from the UE, which are forwarded to the CU through the target DU.

In block 1026, the target CU decides to release the source cell connection. The target CU sends a UE CONTEXT MODIFICATION REQUEST message to the source DU, which includes a generated RRCReconfiguration message including a DAPS-SourceRelease information element (IE) to indicate the release of source cell connection. The UE CONTEXT MODIFICATION REQUEST message may include an indication to indicate the source DU that a DAPS HO is to be completed or source cell is to be released (e.g. set the value of DAPS HO indication to "completion/release/stop"). If the indication is received, the target DU may stop using the configuration for the purpose of power and/or resource coordination during DAPS HO, and/or allow multi-TRP operation during DAPS HO (e.g. enable SDM based Single-DCI based multi-TRP via Enhanced TCI States Activation/Deactivation for UE-specific PDSCH MAC CE).

In block 1028, the target DU forwards the received RRCReconfiguration message to the UE. In block 1030, the source DU responds to the CU with the UE CONTEXT MODIFICATION RESPONSE message. In block 1032, the UE responds to the target DU with an RRCReconfigurationComplete message. In block 1034, the target DU sends an UL RRC MESSAGE TRANSFER message to the CU to convey the received RRCReconfigurationComplete message. In block 1036, the CU sends a UE CONTEXT RELEASE COMMAND message to the source DU. In block 1038, the source DU releases the UE context and responds the CU with a UE CONTEXT RELEASE COMPLETE message. In alternative embodiments, the order of blocks 1024-1038 may vary.

In some embodiments, the CU may send the generated DAPS related coordination configuration to the source DU, e.g. via the UE CONTEXT MODIFICATION REQUEST message in 1006. In some embodiments, the source DU may update/modify the DAPS related coordination configuration and send the requested/updated/new coordination configuration to the CU, e.g. via the UE CONTEXT MODIFICATION RESPONSE message in 1008.

In some embodiments, the target DU may accept or reject partial DAPS request (e.g. accept DAPS request on some DRBs within the DRB list for DAPS request, and reject DAPS request on other DRBs within the DRB list for DAPS request). In alternative embodiments, it may update/modify the DAPS related coordination configuration received from the CU. The target DU may send the DAPS HO response indication (e.g. accepted/rejected DAPS request DRB information list) to the CU (e.g. via the UE CONTEXT SETUP RESPONSE message in block 912 or 1012). The target DU may generate the requested/updated/new DAPS related coordination configuration (e.g. based on the accepted/rejected DAPS request DRB information), and send the configuration to the CU (e.g. via the UE CONTEXT SETUP RESPONSE message in block 912 or 1012). The CU sends the requested/updated/new DAPS related coordination configuration to the source DU (e.g. via UE CONTEXT MODIFICATION REQUEST message in block 914 or 1014). The source DU may apply the requested/updated/new DAPS related coordination configuration and use the configuration for the purpose of either power and/or resource coordination during DAPS HO.

In some embodiments, the target DU may reject DAPS request (e.g. reject DAPS request on all DRBs within the DRB list for DAPS request) and send the DAPS HO reject/response information to the CU (e.g. via the UE CONTEXT SETUP RESPONSE message in block 912 or 1012). The CU sends the DAPS reject/response information to the source DU (e.g. via UE CONTEXT MODIFICATION REQUEST message in block 914 or 1014). If the DAPS reject information is received, the source DU may discard/release the previously generated DAPS related coordination configuration.

FIG. 11 shows one embodiment of Distributed Unit (DU) and target Centralized Unit (CU) communications for inter-CU handover (HO). The CU and DU are discussed above with respect to FIG. 3 and are example basestations. FIG. 11 illustrates communications between the user equipment (UE), a source DU, a target DU, a source CU, and a target CU.

FIG. 11 illustrates that downlink (DL) user data is from the source CU to the source DU or the UE, while uplink (UL) user data is from the UE to the source DU or the source CU. In block 1102, a measurement report (MeasurementReport) message is sent form the UE to the source DU. In block 1104, the source DU sends an UL RRC MESSAGE TRANSFER message to the source CU to convey the received measurement report message.

In block 1106, the source CU sends a UE CONTEXT MODIFICATION REQUEST message to the source DU to query the latest configuration. The message may include a DAPS HO indication to the source DU to indicate that a DAPS HO is to be prepared, configured, initiated or requested. The DAPS HO indication may be the HO indication/indicator described above. The indication may include a list of DRB information that a DAPS HO is to be prepared, configured, initiated, or requested for the concerned DRB, or which type of DAPS HO is to be prepared, configured, initiated, or requested (e.g. inter-frequency DAPS HO, intra-frequency DAPS HO), and/or DAPS HO specific configuration.

In block 1108, the source DU responds with a UE CONTEXT MODIFICATION RESPONSE message that includes full configuration information. If a DAPS HO indication or a inter-frequency DAPS HO indication is received, the source DU may generate and include DAPS HO related coordination configuration (e.g. UL power coordination parameters or configurations and/or resource coordination parameters or configurations) into the message. The DU uses the generated coordination configuration for power and/or resource coordination during DAPS HO. If a DAPS HO indication is received, the source DU may disable multi-TRP operation during DAPS HO (e.g. disable SDM based Single-DCI based multi-TRP via Enhanced TCI States Activation/Deactivation for UE-specific PDSCH MAC CE).

In block 1110, the source CU sends a Handover Request message to the target CU. The message may include a HandoverPreparationInformation message. The message may include a DAPS HO indication to indicate that a DAPS HO is to be prepared, configured, initiated or requested, a list of DRB information that a DAPS HO is to be prepared, configured, initiated or requested for the concerned DRB, which type of DAPS HO is to be prepared, configured, initiated or requested (e.g. inter-frequency DAPS HO, intra-frequency DAPS HO), and/or DAPS specific configuration. The message may also include the DAPS HO related coordination configuration (e.g. UL power coordination parameters/configurations and/or resource coordination parameters/configurations).

In block 1112, the target DU sends a UE CONTEXT SETUP REQUEST message to the target CU to create a UE context and setup one or more data bearers. The UE CONTEXT SETUP REQUEST message may include a HandoverPreparationInformation message. The UE CONTEXT SETUP REQUEST message or HandoverPreparationInformation message may include the DAPS related coordination configuration. The coordination configuration may also be referred to as the HO related configuration. The UE CONTEXT SETUP REQUEST message may include a DAPS HO indication to the target CU to indicate that a DAPS HO is to be prepared, configured, initiated, or requested. It may also include a list of DRB information that a DAPS HO is to be prepared, configured, initiated, or requested for the concerned DRB, and/or which type of DAPS HO is to be prepared, configured, initiated, or requested (e.g. inter-frequency DAPS HO, intra-frequency DAPS HO), and/or a DAPS HO specific configuration.

In block 1114, the target CU responds to the target DU with a UE CONTEXT SETUP RESPONSE message. If a DAPS HO indication is received, the target CU may disable multi-TRP operation during DAPS HO (e.g. disable SDM based Single-DCI based multi-TRP via Enhanced TCI States Activation/Deactivation for UE-specific PDSCH MAC CE). If the DAPS related coordination configuration is received, the target CU uses the received coordination configuration for the purpose of either power or resource coordination during DAPS HO.

In block 1116, the target CU decides whether to accept DAPS HO and sends the Handover Request Acknowledge message to the source CU. The message may include a handover command (i.e. RRCreconfiguration message). The message may include a DAPS response information to indicate if a DAPS HO is accepted/rejected or if a DAPS HO is accepted/rejected for the concerned DRB (e.g. a list of DRB information to indicate whether a DAPS HO is accepted/rejected for the concerned DRB). The message may also include the requested/updated/new DAPS related coordination configuration, which is generated/requested by the target CU or/and the target DU.

In block 1118, the source CU sends a UE CONTEXT MODIFICATION REQUEST message to the source DU, which includes a generated RRCReconfiguration message and indicates to stop the data transmission for the UE. The RRCReconfiguration message may include the DAPS related coordination configuration for the UE. The source DU also sends a Downlink Data Delivery Status frame to inform the CU about the unsuccessfully transmitted downlink data to the UE. For the DAPS handover, the UE CONTEXT MODIFICATION REQUEST message in block 1118 may indicate to stop the data transmission only for the DRB(s) not subject to DAPS handover or may not indicate to stop the data transmission at all. Instead, the DL RRC Message Transfer procedure may be used to carry the handover command to the UE. The UE CONTEXT MODIFICATION REQUEST message that indicates to stop the data transmission for the UE is sent to the source DU once the source CU knows that the UE has successfully accessed the target DU, for which the source DU sends a DDDS frame about the unsuccessfully transmitted downlink data to the source CU.

In block 1120, the source DU forwards the received RRCReconfiguration message to the UE. In block 1122, the source DU responds to the source CU with the UE CONTEXT MODIFICATION RESPONSE message. There may be an optional downlink data delivery status sent from the source DU to the source CU. In block 1124, a Random Access procedure is performed at the target DU. The target DU sends a Downlink Data Delivery Status frame to inform the source CU. Downlink packets (e.g. PDCP PDUs) not successfully transmitted in the source DU, are sent from the source CU to the target DU. In some embodiments, it is up to source CU implementation whether to start sending DL User Data to DU before or after reception of the Downlink Data Delivery Status. In block 1126, the UE responds to the target DU with an RRCReconfigurationComplete message. In block 1128, the target DU sends an UL RRC MESSAGE TRANSFER message to the source CU to convey the received RRCReconfigurationComplete message. Downlink packets are sent to the UE and/or uplink packets are sent from the UE, which are forwarded to the source CU through the target DU.

In block 1130, for a DAPS handover, the target CU sends the Handover Success message to the source CU to inform that the UE has successfully accessed the target cell. In return, the source CU sends the SN Status Transfer message in block 1132 for DRBs configured with DAPS for data forwarding to the target CU.

In block 1134, the target CU decides to release the source cell connection. The target CU sends a UE CONTEXT MODIFICATION REQUEST message to the source DU, which includes a generated RRCReconfiguration message including a DAPS-SourceRelease information element (IE) to indicate the release of source cell connection. The UE CONTEXT MODIFICATION REQUEST message may include an indication to indicate the source DU that a DAPS HO is to be completed or source cell is to be released (e.g. set the value of DAPS HO indication to "completion/release/stop"). If the indication is received, the target DU may stop using the DAPS related coordination configuration for the purpose of power and/or resource coordination during DAPS HO, and/or allow multi-TRP operation during DAPS HO (e.g. enable SDM based Single-DCI based multi-TRP via Enhanced TCI States Activation/Deactivation for UE-specific PDSCH MAC CE).

In block 1136, the target DU forwards the received RRCReconfiguration message to the UE. In block 1138, the source DU responds to the target CU with the UE CONTEXT MODIFICATION RESPONSE message. In block 1140, the UE responds to the target DU with an RRCReconfigurationComplete message. In block 1142, the target DU sends an UL RRC MESSAGE TRANSFER message to the target CU to convey the received RRCReconfigurationComplete message. In block 1144, the target CU sends a UE CONTEXT RELEASE COMMAND message to the source CU. In block 1146, the source CU releases the UE context and in block 1148 receives a response from the source DU including a UE CONTEXT RELEASE COMPLETE message. In alternative embodiments, the order of blocks 1132-1148 may vary.

In some embodiments, the source CU may update and/or modify the DAPS related coordination configuration and send the requested/updated/new DAPS related coordination configuration (e.g. requested/new values for the DAPS related coordination parameters from the target CU) and send the requested/updated/new coordination configuration to the source DU (e.g. via the UE CONTEXT MODIFICATION REQUEST message in block 1118 or 1218). If the requested/new/updated coordination configuration is received, the source DU uses the received configuration for the purpose of power coordination and/or resource coordination during DAPS HO.

In some embodiments, the source CU may send the DAPS HO response information and/or the requested/updated/new coordination configuration to the source DU, which is received from the target CU. It may be sent via the UE CONTEXT MODIFICATION REQUEST message in block 1118 or 1218. If the requested/new/updated coordination configuration is received, the source DU uses the received configuration for power coordination and/or resource coordination during DAPS HO. If the DAPS HO response information indicates that the DAPS HO is rejected, the source DU may discard/release the previously generated/received DAPS related coordination configuration.

Figure 12:
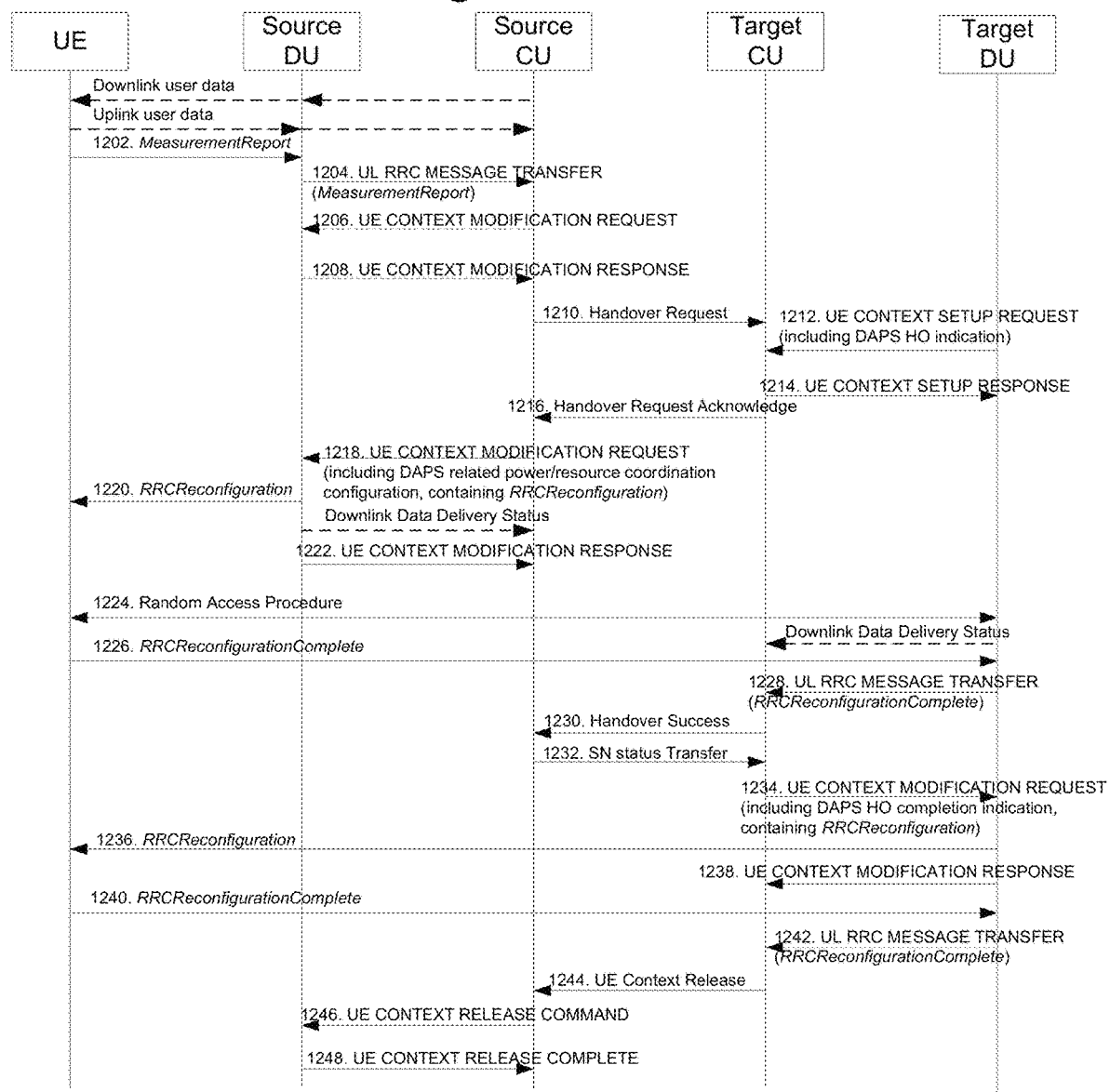
FIG. 12 shows another embodiment of Distributed Unit (DU) and Centralized Unit (CU) communications for inter-CU handover (HO).

FIG. 12 shows another embodiment of Distributed Unit (DU) and target Centralized Unit (CU) communications for inter-CU handover (HO). The CU and DU are discussed above with respect to FIG. 3 and are example basestations. FIG. 12 illustrates communications between the user equipment (UE), a source DU, a target DU, a source CU, and a target CU.

FIG. 12 illustrates that downlink (DL) user data is from the source CU to the source DU or the UE, while uplink (UL) user data is from the UE to the source DU or the source CU. In block 1202, a measurement report (MeasurementReport) message is sent form the UE to the source DU. In block 1204, the source DU sends an UL RRC MESSAGE TRANSFER message to the source CU to convey the received measurement report message.

In block 1206, the source CU sends a UE CONTEXT MODIFICATION REQUEST message to the source DU to query the latest configuration. The message may include a DAPS HO indication to the source DU to indicate that a DAPS HO is to be prepared, configured, initiated or requested. The DAPS HO indication may be the HO indication/indicator described above. The indication may include a list of DRB information that a DAPS HO is to be prepared, configured, initiated, or requested for the concerned DRB, or which type of DAPS HO is to be prepared, configured, initiated, or requested (e.g. inter-frequency DAPS HO, intra-frequency DAPS HO), and/or DAPS HO specific configuration.

In block 1208, the source DU responds with a UE CONTEXT MODIFICATION RESPONSE message that includes full configuration information. If a DAPS HO indication or a inter-frequency DAPS HO indication is received, the source DU may generate and include DAPS related coordination configuration (e.g. UL power coordination parameters or configurations and/or resource coordination parameters or configurations) into the message. The DU uses the generated coordination configuration for power and/or resource coordination during DAPS HO. If a DAPS HO indication is received, the source DU may disable multi-TRP operation during DAPS HO (e.g. disable SDM based Single-DCI based multi-TRP via Enhanced TCI States Activation/Deactivation for UE-specific PDSCH MAC CE).

In block 1210, the source CU sends a Handover Request message to the target CU. The message may include a HandoverPreparationInformation message. The message may include a DAPS HO indication to indicate that a DAPS HO is to be prepared, configured, initiated or requested, a list of DRB information that a DAPS HO is to be prepared, configured, initiated or requested for the concerned DRB, which type of DAPS HO is to be prepared, configured, initiated or requested (e.g. inter-frequency DAPS HO, intra-frequency DAPS HO), and/or DAPS specific configuration. The message may also include the DAPS related coordination configuration (e.g. UL power coordination parameters/configurations and/or resource coordination parameters/configurations).

In block 1212, the target DU sends a UE CONTEXT SETUP REQUEST message to the target CU to create a UE context and setup one or more data bearers. The UE CONTEXT SETUP REQUEST message may include a HandoverPreparationInformation message. The UE CONTEXT SETUP REQUEST message or HandoverPreparationInformation message may include the DAPS related coordination configuration. The coordination configuration may also be referred to as the HO related configuration. The UE CONTEXT SETUP REQUEST message may include a DAPS HO indication to the target CU to indicate that a DAPS HO is to be prepared, configured, initiated, or requested. It may also include a list of DRB information that a DAPS HO is to be prepared, configured, initiated, or requested for the concerned DRB, and/or which type of DAPS HO is to be prepared, configured, initiated, or requested (e.g. inter-frequency DAPS HO, intra-frequency DAPS HO), and/or a DAPS HO specific configuration.

In block 1214, the target CU responds to the target DU with a UE CONTEXT SETUP RESPONSE message. If a DAPS HO indication is received, the target CU may disable multi-TRP operation during DAPS HO (e.g. disable SDM based Single-DCI based multi-TRP via Enhanced TCI States Activation/Deactivation for UE-specific PDSCH MAC CE). If the DAPS related coordination configuration is received, the target CU uses the received coordination configuration for the purpose of either power or resource coordination during DAPS HO.

In block 1216, the target CU decides whether to accept DAPS HO and sends the Handover Request Acknowledge message to the source CU. The message may include a handover command (i.e. RRCreconfiguration message). The message may include a DAPS response information to indicate if a DAPS HO is accepted/rejected or if a DAPS HO is accepted/rejected for the concerned DRB (e.g. a list of DRB information to indicate whether a DAPS HO is accepted/rejected for the concerned DRB). The message may also include the requested/updated/new DAPS related coordination configuration, which is generated/requested by the target CU or/and the target DU.

In block 1218, the source CU sends a UE CONTEXT MODIFICATION REQUEST message to the source DU, which includes a generated RRCReconfiguration message and indicates to stop the data transmission for the UE. The RRCReconfiguration message may include the DAPS related coordination configuration to the UE. The source CU may include a DAPS HO indication and/or DAPS related coordination configuration into the message. If the coordination configuration is received, the source DU uses the received configuration for power coordination and/or resource coordination during DAPS HO. The source DU may send a Downlink Data Delivery Status frame to inform the CU about the unsuccessfully transmitted downlink data to the UE. If a DAPS related information (e.g. DAPS HO indication, DAPS related resource/power coordination configuration, transmission stop indicator) is received, the source DU may disable multi-TRP operation during DAPS HO (e.g. disable SDM based Single-DCI based multi-TRP via Enhanced TCI States Activation/Deactivation for UE-specific PDSCH MAC CE). The UE CONTEXT MODIFICATION REQUEST message may indicate to stop the data transmission for the UE is sent to the source DU once the source CU knows that the UE has successfully accessed the target DU, for which the source DU sends a DDDS frame about the unsuccessfully transmitted downlink data to the source CU.

In block 1220, the source DU forwards the received RRCReconfiguration message to the UE. In block 1222, the source DU responds to the source CU with the UE CONTEXT MODIFICATION RESPONSE message. There may be an optional downlink data delivery status sent from the source DU to the source CU. In block 1224, a Random Access procedure is performed at the target DU. The target DU sends a Downlink Data Delivery Status frame to inform the source CU. Downlink packets (e.g. PDCP PDUs) not successfully transmitted in the source DU, are sent from the source CU to the target DU. In some embodiments, it is up to source CU implementation whether to start sending DL User Data to DU before or after reception of the Downlink Data Delivery Status. In block 1226, the UE responds to the target DU with an RRCReconfigurationComplete message. In block 1228, the target DU sends an UL RRC MESSAGE TRANSFER message to the source CU to convey the received RRCReconfigurationComplete message. Downlink packets are sent to the UE and/or uplink packets are sent from the UE, which are forwarded to the source CU through the target DU.

In block 1230, for a DAPS handover, the target CU sends the Handover Success message to the source CU to inform that the UE has successfully accessed the target cell. In return, the source CU sends the SN Status Transfer message in block 1232 for DRBs configured with DAPS for data forwarding to the target CU.

In block 1234, the target CU decides to release the source cell connection. The target CU sends a UE CONTEXT MODIFICATION REQUEST message to the source DU, which includes a generated RRCReconfiguration message including a DAPS-SourceRelease information element (IE) to indicate the release of source cell connection. The UE CONTEXT MODIFICATION REQUEST message may include an indication to indicate the source DU that a DAPS HO is to be completed or source cell is to be released (e.g. set the value of DAPS HO indication to "completion/release/stop"). If the indication is received, the target DU may stop using the DAPS related coordination configuration for the purpose of power and/or resource coordination during DAPS HO, and/or allow multi-TRP operation during DAPS HO (e.g. enable SDM based Single-DCI based multi-TRP via Enhanced TCI States Activation/Deactivation for UE-specific PDSCH MAC CE).

In block 1236, the target DU forwards the received RRCReconfiguration message to the UE. In block 1238, the source DU responds to the target CU with the UE CONTEXT MODIFICATION RESPONSE message. In block 1240, the UE responds to the target DU with an RRCReconfigurationComplete message. In block 1242, the target DU sends an UL RRC MESSAGE TRANSFER message to the target CU to convey the received RRCReconfigurationComplete message. In block 1244, the target CU sends a UE CONTEXT RELEASE COMMAND message to the source CU. In block 1246, the source CU releases the UE context and in block 1248 receives a response from the source DU including a UE CONTEXT RELEASE COMPLETE message. In alternative embodiments, the order of blocks 1232-1248 may vary.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A wireless communication method comprising:
   sending, from a source central unit (CU) to a target CU, a first request message for a handover including a handover indication;
   receiving, by the source CU from the target CU, a response message to the first request message, the response message including a handover related configuration based on the handover indication, wherein the handover is a Dual Active Protocol Stack (DAPS) handover of a user equipment (UE) from a source cell to a target cell during which the UE maintains a connection with the source cell and the target cell, the source cell residing in the source CU and the target cell residing in the target CU; and
   sending, by the source CU to a source distributed unit (DU), a third request message to indicate a DAPS handover related coordination configuration for power coordination between the source cell and the target cell during the DAPS handover.

2. The method of claim 1, wherein the first request message is a handover request message, and the response message is a handover request acknowledge message.

3. The method of claim 1, wherein the handover indication comprises at least one of:
   an indication for DAPS handover initiation; or
   a list of Data Radio Bearers (DRB) information that a DAPS handover is to be initiated for a concerned DRB.

4. The method of claim 1, wherein the first request message further comprises a DAPS handover related coordination configuration; and the response message comprises the handover related configuration for the target cell.

5. The method of claim 1, wherein the DAPS handover related coordination configuration comprises
   DAPS handover related power coordination parameters.

6. A wireless communications apparatus comprising a processor and a memory, wherein the processor is configured to read code from the memory and implement the method recited in claim 1.

7. A computer program product comprising a non-transitory computer readable storage medium to store codes, the codes, when executed by a processor, causing the processor to implement the method recited in claim 1.

8. The method of claim 1, further comprising:
   sending, by the source CU to a source distributed unit (DU), a second request message, wherein the second request message comprises a DAPS handover status indication to indicate that the DAPS handover is initiated.

9. The method of claim 8, wherein the second request message is a UE context modification message.

10. A wireless communication method comprising:
    receiving, by a target central unit (CU) from a source CU, a first request message for a handover including a handover indication; and
    sending, by the target CU to the source CU, a response message to the first request message, the response message including a handover related configuration based on the handover indication, wherein
    the handover is a Dual Active Protocol Stack (DAPS) handover of a user equipment (UE) from a source cell to a target cell during which the UE maintains a connection with the source cell and the target cell, the source cell residing in the source CU and the target cell residing in the target CU; and wherein
    the response message causes the source CU to send to a source distributed unit (DU) a third request message to indicate a DAPS handover related coordination configuration for power coordination between the source cell and the target cell during DAPS handover.

11. The method of claim 10, wherein the first request message is a handover request message, and the response message is a handover request acknowledge message.

12. The method of claim 10, wherein the handover indication comprises at least one of:
   an indication for DAPS handover initiation; or
   a list of Data Radio Bearers (DRB) information that a DAPS handover is to be initiated for the concerned DRB.

13. The method of claim 10, wherein the first request message further comprises a DAPS handover related coordination configuration; and the response message comprises the handover related configuration for the target cell.

14. The method of claim 10, wherein the DAPS handover related coordination configuration comprises:
   DAPS handover related power coordination parameters.

* * * * *